(12) United States Patent
Schroeder

(10) Patent No.: US 10,873,497 B2
(45) Date of Patent: *Dec. 22, 2020

(54) SYSTEMS AND METHODS FOR MAINTAINING COMMUNICATION LINKS

(71) Applicant: Verizon Patent and Licensing Inc., Basking Ridge, NJ (US)

(72) Inventor: Ted Schroeder, Saratoga, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/731,157

(22) Filed: Dec. 31, 2019

(65) Prior Publication Data
US 2020/0136893 A1 Apr. 30, 2020

Related U.S. Application Data

(63) Continuation of application No. 15/593,181, filed on May 11, 2017, now Pat. No. 10,554,480.

(51) Int. Cl.
*H04L 12/24* (2006.01)
*H04L 29/06* (2006.01)
(Continued)

(52) U.S. Cl.
CPC .......... *H04L 41/0654* (2013.01); *G06F 21/31* (2013.01); *H04L 63/0281* (2013.01);
(Continued)

(58) Field of Classification Search
CPC ... H04L 41/0654; H04L 63/08; H04L 63/102; H04L 63/10; H04L 69/40; H04L 67/10; H04L 67/42; H04L 63/0815; G06F 21/31
See application file for complete search history.

(56) References Cited

U.S. PATENT DOCUMENTS 6,226,750 B1 5/2001 Trieger
6,366,577 B1 4/2002 Donovan
(Continued)

FOREIGN PATENT DOCUMENTS

CN 1514569 A 7/2004
GB 2367725 A 4/2002
(Continued)

OTHER PUBLICATIONS

Olson L., et al., "Trust Negotiation as an Authorization Service for Web Services," 29th International Conference on Data Engineering Workshops 2013 (ICDEW), 2006, pp. 21.
(Continued)

*Primary Examiner* — Todd L Barker

(57) ABSTRACT

The various embodiments described herein include methods, devices, and systems for maintaining communication links. In one aspect, a computing system includes: (1) a client agent communicatively coupled to a client device, the client agent configured to: (a) facilitate communication between the client device and a remote server via a communication channel including a first portion of the communication channel between the client device and the client agent; and (b) maintain the first portion of the communication channel during a communication outage in a different portion of the communication channel; and (2) a communications server distinct from the client device and the remote server, the communications server configured to: (a) enable communication between the client device and the remote server via the communication channel; and (b) reestablish the communication channel in the event of a communication outage between the client agent and the remote server.

20 Claims, 11 Drawing Sheets

(51) Int. Cl.
*G06F 21/31* (2013.01)
*H04L 29/14* (2006.01)
*H04L 29/08* (2006.01)

(52) U.S. Cl.
CPC ........ *H04L 63/0815* (2013.01); *H04L 63/102* (2013.01); *H04L 69/40* (2013.01); *H04L 63/08* (2013.01); *H04L 63/10* (2013.01); *H04L 67/10* (2013.01); *H04L 67/42* (2013.01)

(56) References Cited

U.S. PATENT DOCUMENTS

| | | | |
|---|---|---|---|
| 6,687,822 B1 | 2/2004 | Jakobsson | |
| 6,721,787 B1 * | 4/2004 | Hiscock | H04W 4/00 709/217 |
| 7,131,000 B2 | 10/2006 | Bradee | |
| 7,155,738 B2 | 12/2006 | Zhu et al. | |
| 7,428,750 B1 | 9/2008 | Dunn et al. | |
| 7,536,544 B2 | 5/2009 | Xiao | |
| 7,562,382 B2 | 7/2009 | Hinton et al. | |
| 7,596,530 B1 | 9/2009 | Glasberg | |
| 7,630,986 B1 | 12/2009 | Herz et al. | |
| 7,644,446 B2 | 1/2010 | Strom et al. | |
| 7,657,639 B2 | 2/2010 | Hinton | |
| 7,673,046 B2 | 3/2010 | Lehew et al. | |
| 7,814,531 B2 | 10/2010 | Khosravi et al. | |
| 7,831,047 B2 | 11/2010 | Rowe | |
| 7,900,046 B2 | 3/2011 | Baliga et al. | |
| 7,996,631 B1 | 8/2011 | Bender et al. | |
| 8,141,139 B2 | 3/2012 | Hinton et al. | |
| 8,196,177 B2 | 6/2012 | Hinton et al. | |
| 8,214,394 B2 | 7/2012 | Krishnaprasad et al. | |
| 8,214,634 B1 | 7/2012 | Steele et al. | |
| 8,255,984 B1 | 8/2012 | Ghostine et al. | |
| 8,359,360 B2 | 1/2013 | Logue et al. | |
| 8,375,430 B2 | 2/2013 | Grewal et al. | |
| 8,382,593 B2 | 2/2013 | Edgren et al. | |
| 8,396,949 B2 | 3/2013 | Bubolz et al. | |
| 8,443,435 B1 | 5/2013 | Schroeder | |
| 8,447,976 B2 | 5/2013 | Jain et al. | |
| 8,522,019 B2 | 8/2013 | Michaelis | |
| 8,590,029 B2 | 11/2013 | Vitaletti | |
| 8,667,593 B1 | 3/2014 | Shnitzer | |
| 8,707,451 B2 | 4/2014 | Ture et al. | |
| 8,713,175 B2 | 4/2014 | Logue et al. | |
| 8,732,452 B2 | 5/2014 | Byrum et al. | |
| 8,782,759 B2 | 7/2014 | Hinton et al. | |
| 8,793,769 B2 | 7/2014 | Marcia et al. | |
| 8,843,997 B1 | 9/2014 | Hare | |
| 8,855,312 B1 | 10/2014 | Hodgman et al. | |
| 8,856,891 B2 | 10/2014 | Whitcomb | |
| 8,856,957 B1 | 10/2014 | Roth et al. | |
| 8,875,249 B2 | 10/2014 | Ture et al. | |
| 8,903,315 B2 | 12/2014 | Pering et al. | |
| 9,398,026 B1 | 7/2016 | Dall et al. | |
| 9,398,050 B2 | 7/2016 | Islam et al. | |
| 2002/0095571 A1 | 7/2002 | Bradee | |
| 2002/0156965 A1 | 10/2002 | Gusler et al. | |
| 2002/0184507 A1 | 12/2002 | Makower et al. | |
| 2003/0023689 A1 | 1/2003 | Brown et al. | |
| 2003/0130960 A1 | 7/2003 | Fraser et al. | |
| 2003/0140131 A1 | 7/2003 | Chandrashekhar et al. | |
| 2003/0167308 A1 | 9/2003 | Schran | |
| 2003/0220880 A1 | 11/2003 | Lao et al. | |
| 2004/0098620 A1 | 5/2004 | Shay | |
| 2004/0128392 A1 | 7/2004 | Blakley et al. | |
| 2004/0128542 A1 | 7/2004 | Blakley et al. | |
| 2004/0187031 A1 | 9/2004 | Liddle | |
| 2004/0220878 A1 | 11/2004 | Lao et al. | |
| 2004/0259633 A1 | 12/2004 | Gentles et al. | |
| 2004/0268145 A1 | 12/2004 | Watkins et al. | |
| 2005/0015586 A1 | 1/2005 | Brickell | |
| 2005/0097321 A1 | 5/2005 | Zhu et al. | |
| 2005/0132229 A1 | 6/2005 | Zhang et al. | |
| 2005/0213584 A1 | 9/2005 | Donovan | |
| 2005/0223217 A1 | 10/2005 | Howard et al. | |
| 2005/0223413 A1 | 10/2005 | Duggan et al. | |
| 2005/0238034 A1 | 10/2005 | Gillespie et al. | |
| 2006/0020679 A1 | 1/2006 | Hinton et al. | |
| 2006/0059544 A1 | 3/2006 | Guthrie et al. | |
| 2006/0090074 A1 | 4/2006 | Matoba | |
| 2006/0156026 A1 | 7/2006 | Utin | |
| 2006/0212931 A1 | 9/2006 | Shull et al. | |
| 2006/0236382 A1 | 10/2006 | Hinton et al. | |
| 2006/0259950 A1 | 11/2006 | Mattsson | |
| 2007/0006282 A1 | 1/2007 | Durham et al. | |
| 2007/0021954 A1 * | 1/2007 | El-Damhougy | G06F 13/387 703/21 |
| 2007/0101400 A1 | 5/2007 | Freeman et al. | |
| 2007/0143629 A1 | 6/2007 | Hardjono et al. | |
| 2007/0208745 A1 | 9/2007 | Ture et al. | |
| 2007/0208755 A1 | 9/2007 | Bhatkar et al. | |
| 2008/0005359 A1 | 1/2008 | Khosravi et al. | |
| 2008/0010665 A1 | 1/2008 | Hinton et al. | |
| 2008/0034420 A1 | 2/2008 | Chang | |
| 2008/0046984 A1 | 2/2008 | Bohmer et al. | |
| 2008/0109904 A1 | 5/2008 | In et al. | |
| 2008/0112551 A1 | 5/2008 | Forbes et al. | |
| 2008/0222174 A1 | 9/2008 | Lyman | |
| 2008/0229025 A1 | 9/2008 | Plamondon | |
| 2008/0229427 A1 | 9/2008 | Ramirez | |
| 2008/0320567 A1 | 12/2008 | Shulman et al. | |
| 2009/0070863 A1 | 3/2009 | Shimizu et al. | |
| 2009/0083403 A1 | 3/2009 | Xu et al. | |
| 2009/0094164 A1 | 4/2009 | Fontaine et al. | |
| 2009/0150297 A1 | 6/2009 | Richard | |
| 2009/0182592 A1 | 7/2009 | Ballaro et al. | |
| 2009/0217033 A1 | 8/2009 | Costa et al. | |
| 2009/0259753 A1 | 10/2009 | Hinton et al. | |
| 2009/0319781 A1 | 12/2009 | Byrum et al. | |
| 2009/0328186 A1 | 12/2009 | Pollutro et al. | |
| 2010/0054480 A1 | 3/2010 | Schneider | |
| 2010/0122333 A1 | 5/2010 | Noe | |
| 2010/0174810 A1 | 7/2010 | Cain et al. | |
| 2010/0189260 A1 | 7/2010 | Ramanathan et al. | |
| 2010/0242083 A1 | 9/2010 | Begum et al. | |
| 2010/0242099 A1 | 9/2010 | Tsao | |
| 2010/0313016 A1 | 12/2010 | Zhang et al. | |
| 2010/0313276 A1 | 12/2010 | Banti et al. | |
| 2010/0325710 A1 | 12/2010 | Etchegoyen | |
| 2011/0013637 A1 | 1/2011 | Xue et al. | |
| 2011/0047381 A1 | 2/2011 | Ganesan et al. | |
| 2011/0061103 A1 | 3/2011 | Salkewicz | |
| 2011/0078775 A1 | 3/2011 | Yan | |
| 2011/0093519 A1 * | 4/2011 | Carricarte | G06F 16/10 709/203 |
| 2011/0145565 A1 | 6/2011 | Kol et al. | |
| 2011/0305333 A1 | 12/2011 | Jacobson et al. | |
| 2012/0022928 A1 | 1/2012 | Wu | |
| 2012/0084570 A1 | 4/2012 | Kuzin et al. | |
| 2012/0144464 A1 | 6/2012 | Fakhrai et al. | |
| 2012/0164982 A1 | 6/2012 | Klein | |
| 2012/0254957 A1 | 10/2012 | Fork et al. | |
| 2012/0331532 A1 | 12/2012 | Walters et al. | |
| 2013/0107889 A1 | 5/2013 | Barabash et al. | |
| 2013/0159704 A1 | 6/2013 | Chandrasekaran | |
| 2013/0185799 A1 | 7/2013 | Pfeifer et al. | |
| 2013/0191494 A1 | 7/2013 | Sidhu et al. | |
| 2013/0219164 A1 | 8/2013 | Hamid | |
| 2013/0275376 A1 | 10/2013 | Hudlow et al. | |
| 2013/0276086 A1 | 10/2013 | Yu | |
| 2013/0318577 A1 | 11/2013 | Bulusu et al. | |
| 2013/0326228 A1 | 12/2013 | Utin | |
| 2014/0006598 A1 | 1/2014 | Uola | |
| 2014/0007229 A1 | 1/2014 | Smith et al. | |
| 2014/0013396 A1 | 1/2014 | Field-Eliot et al. | |
| 2014/0075184 A1 | 3/2014 | Gorbach et al. | |
| 2014/0090033 A1 | 3/2014 | Lerner et al. | |
| 2014/0096199 A1 | 4/2014 | Dave et al. | |
| 2014/0099922 A1 | 4/2014 | Cazanas et al. | |
| 2014/0122873 A1 | 5/2014 | Deutsch et al. | |
| 2014/0157370 A1 | 6/2014 | Plattner et al. | |
| 2014/0222955 A1 | 8/2014 | Islam et al. | |
| 2014/0223178 A1 | 8/2014 | Islam et al. | |

(56) References Cited

U.S. PATENT DOCUMENTS

| | | |
|---|---|---|
| 2015/0237035 A1 | 8/2015 | Islam et al. |
| 2016/0036624 A1* | 2/2016 | Roy ................ H04W 24/04 370/221 |
| 2016/0080529 A1 | 3/2016 | Lin et al. |
| 2018/0331886 A1 | 11/2018 | Schroeder |

FOREIGN PATENT DOCUMENTS

| | | |
|---|---|---|
| WO | 2008021454 A2 | 2/2008 |
| WO | 2009136795 A1 | 11/2009 |
| WO | 2012091810 A1 | 7/2012 |

OTHER PUBLICATIONS

Reimer T., et al., "Federated Identity Access Broker Pattern for Cloud Computing," Network-Based Information System (NBIS), 2013 16th International Conference on IEEE, 2013, 9 pages.

* cited by examiner

SYSTEMS AND METHODS FOR MAINTAINING COMMUNICATION LINKS

RELATED APPLICATIONS

This application is a continuation of U.S. patent application Ser. No. 15/593,181, filed May 11, 2017, which is related to U.S. patent application Ser. No. 15/005,452, filed Jan. 25, 2016, which are incorporated herein by reference in their entirety.

TECHNICAL FIELD

The disclosed implementations relate to the field of computer networks generally, including but not limited to, maintaining communication links during a communication outage.

BACKGROUND

Computer communication networks have become the de facto method of communication for the modern world. In addition to communication between private citizens, various organizations use computer communication networks to communicate, share information, and share documents. Much of this communication is transmitted over non-private computer networks (such as the Internet).

Organizations, such as corporations and governments, often need to communicate sensitive information over the Internet. Organizations often desire to make data and services available to users who are located remotely from the computer systems that store the data and provide the services. As such, being able to securely transmit the information over the Internet is very important.

However, remote connections across multiple networks are vulnerable to communication failure. A failure by any one of the networks could lead to a communication failure. Reestablishing a secure connection in the event of a communication failure can be a cumbersome, time-consuming process.

SUMMARY

Accordingly, there is a need for devices and systems implementing more efficient and effective methods for maintaining communication links during a communication outage. For example, a system configured to maintain the endpoints of a communication channel, such as a TCP connection, during a communication outage could enable a user to bypass lengthy validation and/or login procedures. Rather than having to establish an entirely new communication channel, the system can reestablish the original channel by maintaining the endpoints until communications have been restored; either by rerouting the channel through a new network or waiting until the failed network recovers.

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to monitor activity on a premises.

In one aspect, some implementations include a computing system having a client agent communicatively coupled to a client device and a communications server distinct from the client device and a remote server. The client agent being configured to: (1) facilitate communication between the client device and the remote server via a communication channel including a first portion of the communication channel between the client device and the client agent; and (2) maintain the first portion of the communication channel during a communication outage in a different portion of the communication channel. The communications server configured to: (1) enable communication between the client device and the remote server via the communication channel; and (2) reestablish the communication channel in the event of a communication outage between the client agent and the remote server.

In some implementations, the computing system further includes a server agent communicatively coupled to the remote server. The server agent being configured to: (1) facilitate the communication between the remote server and the client device via the communication channel including a second portion of the communication channel between the remote server and the server agent; and (2) maintain the second portion of the communication channel during a communication outage in a different portion of the communication channel.

In some implementations, the client agent is a component of the client device. In some implementations, the server agent is distinct from the remote server. In some implementations, the communication channel comprises a transmission control protocol (TCP) communication channel. In some implementations, the communication channel includes the first portion between the client device and the client agent, a second portion between the client agent and a server agent, and a third portion between the server agent and the remote server. In some implementations, the second portion of the communication channel corresponds to one or more networks, including one or more wireless networks.

In some implementations, reestablishing the communication channel includes re-enabling communication between the client device and the remote server without submission and/or validation of user credentials.

In another aspect, some implementations include a method performed at a computing system having one or more processors and memory. The method includes: (1) enabling communication between a client device and a remote server via a communication channel; (2) detecting a communication failure in the communication channel between the client device and the remote server; (3) maintaining a portion of the communication channel at the client device and a portion of the communication channel at the remote server; and (4) in response to detecting the communication failure, reestablishing the communication channel while maintaining the portion of the communication channel at the client device and the portion of the communication channel at the remote server.

In yet another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Thus, devices, storage mediums, and computing systems are provided with methods for maintaining communication channels, thereby increasing the effectiveness, efficiency, and user satisfaction with such systems. Such methods may complement or replace conventional methods for maintaining and/or reestablishing communication channels.

BRIEF DESCRIPTION OF THE DRAWINGS

Like reference numerals refer to corresponding parts throughout the drawings.

DESCRIPTION OF IMPLEMENTATIONS

Systems are described herein for improving network communications performed over the Internet or any other computer network. In some implementations, the network in question is a corporate network for a large organization with diverse operations—sometimes in multiple countries—and a host of employees who perform a variety of different roles in the organization and who need to access the organization's network—sometimes using a variety of client devices. Securing corporate networks is particularly important because organizations with sensitive information are at risk from malicious attacks that target networked assets (e.g. servers accessible over public computer networks, such as the Internet, or data stored in a network) or target actual communications that are transmitted over the publically accessible network. Establishing secure connections can be a lengthy and complicated procedure for users. Therefore, it is important to be able to maintain connections during temporary communication failures. This may include maintaining the endpoints of a communication channel while reestablishing and/or rerouting a midpoint connection. Maintaining the existing channel endpoints until communication can be reestablished, rather than requiring that the user establish a new communication channel, can enable users to bypass the validation and/or login procedure associated with establishing a secure connection.

In some implementations, a system for securing network assets and network communications provides maintenance of communication channels, dynamic access control, server invisibility, application/system health checks, and automatic end-to-end security for applications. In some implementations, the network security system does not require or depend on particular applications or client systems or server platforms. Thus, the system is flexible enough to be used by a variety of organizations with different devices, operating systems, and/or hardware.

Figure 1:
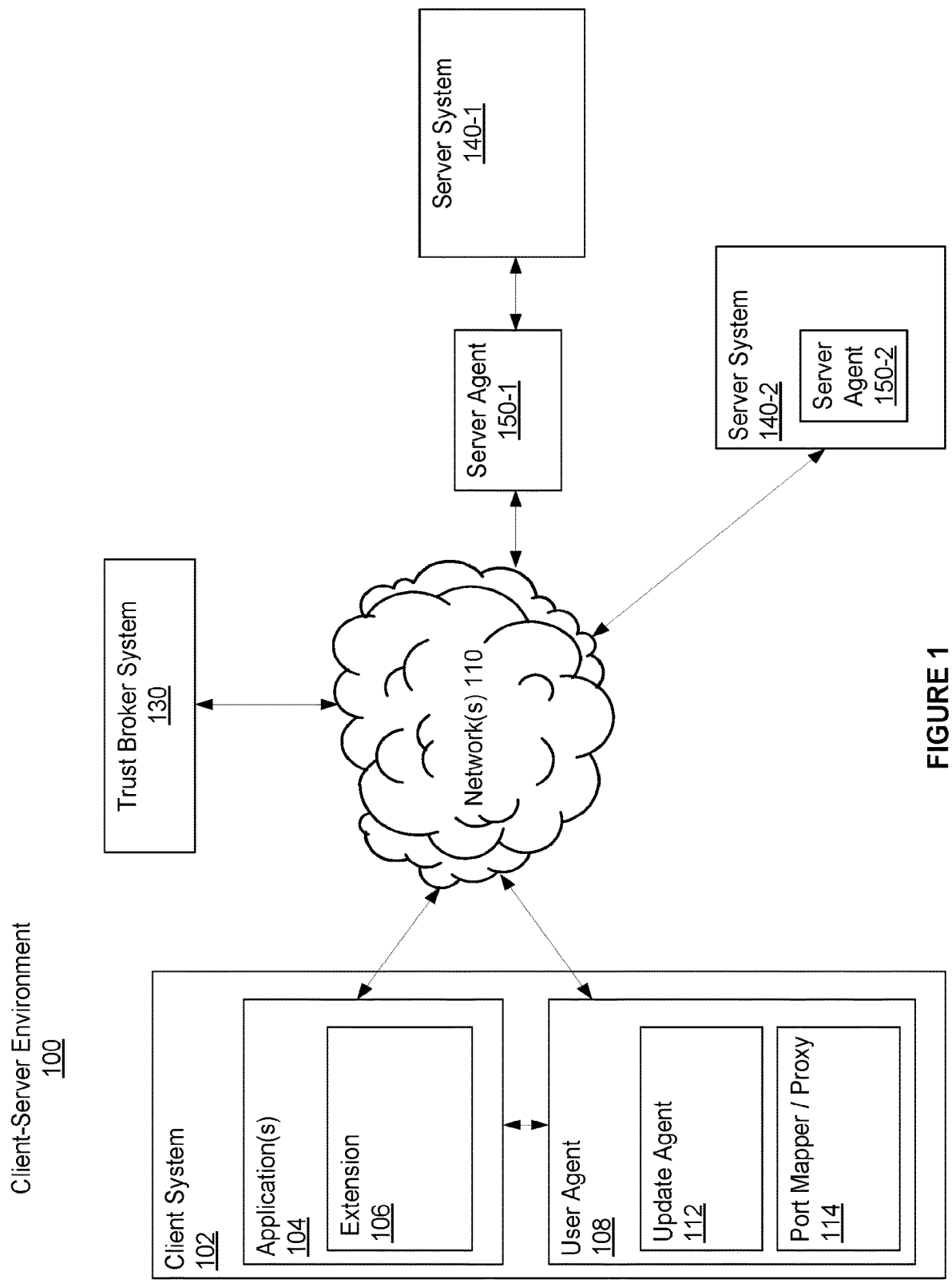
FIG. 1 is a block diagram illustrating a representative client-server environment in accordance with some implementations.

FIG. 1 is a block diagram illustrating a client-server environment 100 in accordance with some implementations. The client-server environment 100 includes a client system 102 and a remote system for securing organizational assets and communications over a network that includes a trust broker system 130, one or more server agents 150, and one or more server systems 140-1 and 140-2, all connected over one or more networks 110. In some implementations, the client system 102 includes one or more client applications 104 and a user agent 108. The network 110 may be any of a variety of networks, including local area networks (LAN), metropolitan area networks, wide area networks (WAN), wireless networks, wired networks, the Internet, or a combination of such networks.

In accordance with some implementations, the client server environment 100 also includes one or more client systems 102, such as laptop computers, smart phones, tablets, and desktop computers. In some implementations, the client system 102 includes one or more client applications 104 and a user agent 108. In some implementations, the one or more client applications 104 include, but are not limited to, a web browsing application for connecting to the server system 140, an application for securely connecting to a remote system or device, and/or other communication applications. In accordance with some implementations, when the client system 102 wishes to access the information stored at a server system 140 or the service provided by a server system 140, the client system 102 must first install/initialize a trusted user agent application 108.

In some implementations, the user agent 108 is an application that executes on a client system 102 and enables the client system 102 to establish a secure connection with the trust broker system 130. Once a secure connection has been established with the trust broker system 130, the client system 102 is enabled to request data or services from the trust broker system 130. In some implementations, the user agent 108 is an extension 106 of a web browsing application 104. For example, the user agent 108 can be installed as a third party add-on or plug-in for common web browsing applications, such as Chrome, Firefox, or Internet Explorer. In some implementations, the web browser 104 is custom developed to natively include the capabilities of the user agent 108 without the use of extensions. In such an implementation, the customized web browser 104 would be used without an independent user agent 108 application. In some implementations, the user agent is incorporated into an application (App) on a mobile phone.

In some implementations, the client system 102 launches the user agent 108 when the client system needs to interact with the trust broker system 130. In some implementations, the user agent 108 is responsible for initiating a user authentication process with the trust broker system 130. In some implementations, the trust broker system 130 is configured to ensure that only trusted client systems and/or users are permitted to access a secure server system 140. In some implementations, the user agent 108 performs a system safety check on the client system 102. In some implementations, the user agent 108 scans the system for malicious software and verifies the identity of the client system by retrieving a digital certificate or system finger print from the client system 102 and then comparing the received digital certificate or system fingerprint with previously received digital certificate or system fingerprints. In this way the trust broker system 130 can identify the specific client system 102 and determine whether the software on the client system has changed.

In some implementations, the user agent 108 has an auto self-update capability for automatically updating software used to access the server system 140 based on instructions received from the server system 140 via the trust broker system 130. For example, the user agent 108 checks with the trust broker system 130 to determine whether there are any updates to the malicious code scanning software prior to scanning the client system 102 for potentially malicious code. Once the malicious code scanning software has been updated to the most current version, the user agent 108 does a virus scan and determines if any viruses or other malicious code are currently active on the client system 102.

In some implementations, the user agent 108 establishes and maintains communication channel(s) between the client system 102 and the server system(s) 140. In some implementations, the user agent 108 maintains the communication channel(s) by acknowledging commands and requests generated by the client system 102, regardless of whether an acknowledgement is received from the server system(s) 140.

In some implementations, the trust broker system 130 is responsible for establishing and maintaining communication channel(s) between the client system 102 and the server system(s) 140. In some implementations, the trust broker system 130 is configured to reestablish communication links between the client system and the server system(s) in the event of a network failure.

In some implementations, the trust broker system 130 is responsible for ensuring the security of the client system 102 and verifying the identity of the user. In some implementations the user agent 108 is responsible for retrieving information requested by the trust broker system 130. For example, in concert with the user agent 108, the trust broker system 130 determines the integrity and health of the client system prior to allowing the user agent to establish connections with the server system.

In some implementations, the user agent 108 determines that the client system 102 is found to be unsafe or fails to verify the identity of the client system 102 or the user of the client system 102. In accordance with this determination, the user agent displays a message to the user and ceases further validation attempts without contacting the trust broker system 130. In some implementations, the message includes a brief explanation describing why the system safety check failed, such as an error code or a text description.

In some implementations, the user agent 108 determines that the client system 102 is safe but must still verify that a particular user is authorized to use the client system 102. The user's identity can be established through a variety of methods. For example, in some implementations, the user agent 108 verifies a user's identity by requesting user credentials (such as username/password, USB token, RSA token number, or any other secure identification method). In some implementations, once the user's identity has been established the user agent must determine whether the identified user is authorized to use the specific client system 102 on which the user agent 108 is operating. In some implementations, each client system 102 is assigned to one or more specific users and thus only the assigned users will be authorized by the user agent 108. In some implementations the user agent 108 compares the received user credentials against a list of authorized users stored on the client system 102 itself. In some implementations, the user agent 108 transmits the user credentials to the trust broker system 130 for verification.

In some implementations, after verification, the user agent 108 requests a secure connection with the trust broker system 130. Once the trust broker system 130 verifies the client system 102 (see discussion below), the trust broker system 130 establishes a secure connection with the user agent 108. In some implementations, the application 104 on the client system 102 requests data or services associated with the trust broker system 130 or the server system(s) 140. In response the user agent 108 receives tailored information from the trust broker system 130. In some implementations, the information received from the trust broker system 130 includes one or more of: session keys (for encrypting communications), the network address of a proxy server with a server agent 150 or of the server system 140 itself, port numbers, and encrypted client identification code to identify the client system 102 to a server agent 130 associated with the information or service requested by the client system 102. In some implementations, the user agent 108 receives the network address of the server agent 150 associated with the requested data or service.

In some implementations, the client system 102 receives information necessary to install needed applications and system configuration information. For example, some client systems 102 do not permanently store applications or information necessary to perform certain functions and instead download the necessary data from a server system 140 as needed. In some implementations, the client system 102 determines whether one or more important applications are up to date. If the client system 102 determines that the one or more applications have not been updated to the most recent approved version of the one or more applications, the client system 102 receives information necessary to update the applications from the trust broker system 130.

In some implementations, the client system 102 uses the user agent 108 to secure a connection with a server agent 130 to receive the requested data or service. The user agent 108 receives the requested data or service in an encrypted communication session. In some implementations, the encryption key used to encrypt communications is periodically changed.

In some implementations, the user agent 108 includes an update agent 112 and a port mapper or proxy 114. The update agent 112 determines whether applications on the client system 102 are the most recent approved version and, if not, receiving the information necessary to update the relevant applications. The port mapper or proxy 114 is used to route application data to the appropriate server system 140, such as an application server.

The system for improving the security of organization assets and communication on a computer network 110 is important because organizations with sensitive information are at risk from malicious attacks that target networked assets (e.g., servers accessible over public computer networks 110, such as the Internet) or actual communications that are transmitted over the publically accessible network 110. In some implementations, the system for improving the security of organization assets and communication on a computer network(s) 110 provides communication maintenance, dynamic access control, server invisibility, application/system health checks, and automatic end-to-end security for applications. In some implementations, the system does not require or depend on particular applications or client or server platforms. Thus, the system is flexible enough to be used by a variety of organizations with different operating systems and hardware.

In some implementations, a trust broker system 130 manages the entire secure communication network and the interactions between client systems 102 and the server systems 140. This process optionally begins when the trust broker system 130 receives a connection request from a user agent 108. The trust broker system 130 first verifies the identity of the client system 102. Verifying the client system 102 includes receiving information identifying the client system 108 on which the user agent 108 is executing. For example, in some implementations the trust broker system 130 receives the IP address of the client system 102, the MAC address of the client system 102, a value uniquely associated with the computer (such as an encrypted name value), a serial number of the computer, a software/hardware finger print, an encrypted message from a TPM (Trusted Platform Module), or any other uniquely identifying data.

In some implementations, the trust broker system 130 validates the integrity of the client system 102. The trust broker system 130 receives a generated system fingerprint (e.g., a software and/or hardware fingerprint) for the client system 102. In some implementations, the trust broker system 130 receives a fingerprint from a trusted processor module (TPM) chip on the client system 120. The generated system fingerprint contains information describing the applications installed on the client system 102. For example, the client system 102 creates a hash value of the list of applications installed on the client system. The trust broker system 130 then looks up the hash value on a stored list of approved or authorized client systems 102. If the hash value matches a value in the stored list of approved client systems 102, the integrity of the client system 102 is confirmed.

In some implementations, the trust broker system 130 further verifies the integrity of the client system 102 by determining whether any new software has been installed on the client system 102 since the last time the system was validated. This can be done using one or more techniques. For example, in some implementations, the system fingerprint is checked to determine if it has changed since the last connection. If new software has been installed, the trust broker system 130 causes the client system 102 to be scanned for malicious software. In some implementations, the trust broker system 130 transmits instructions for scanning to the client system 130 and conducts the scan remotely. In other implementations, the client system 102 conducts the scan and reports the results to the trust broker system 130. In yet other implementations, the trust broker system 130 determines whether the scanning software on the client system 120 is up to date, and if so, determines that the client system 102 is secure.

In some implementations, the trust broker system 130 determines the physical location of the client system 102. For example, in some implementations, the trust broker system 130 estimates the location of the client system 102 from the IP address associated with the client system 102, which is generally correlated with the location from which the device is accessing the Internet. In accordance with some implementations, the trust broker system 130 determines the location of the client system 102 by accessing a GPS device associated with the client system 102. Once the physical location of the client system 102 is determined, the trust broker system 130 retrieves a list of authorized regions within which the specific client system 102 is authorized to operate. For example, some client devices 102 are only authorized to be used in a specific city, state, or country. Other client devices are only authorized to be used in a specific building. If the client system 102 is determined to be within an authorized region, the trust broker system 130 allows the secure connection to continue. If not, the connection is terminated and a message is sent to the client system 102 explaining the reason for the disconnection. For example, if a client system 102 is authorized to be use in Atlanta, Ga. and its suburbs, but the trust broker system 130 determines the client system 102 is requesting a connection from Paris, France, the trust broker system 130 would then determine terminate the connection.

In some implementations, the trust broker system 130 also verifies the identity of the user of the client system 102. This can be accomplished by any acceptable technique. For example, in some implementations, the trust broker system 130 receives an identifier (such as a password) associated with the user. In some implementations, the identifier is a random number that is used for only one communication session. In some implementations, the identifier is a name or password associated with the user that has been encrypted. The encryption is done using a key that is changed with each communication session, thus ensuring that the identifier changes for each communication session. The trust broker system 130 then uses the identifier to identify the identity of the user of the client system 102 by cross referencing the received identifier against a list of authorized users and their associated identifiers. Once the identity of the user is established, the trust broker system 130 is able to determine whether the user is authorized to interact with the trust broker system 130.

In some implementations, once the trust broker system 130 verifies the integrity and identity of the client system 102 and its user, the trust broker system 130 establishes a secure communication session with the user agent 108 at the client system 102. As noted above, the communication session is encrypted. In some implementations, once the secure communication session has been established with the user agent 108, the trust broker system 130 provides the user agent with a list of applications and services that it is allowed to access; e.g., access to a specific file or corporate email.

In some implementations, when a request for data or services is received, the trust broker system 130 determines what network resources the client device 102 is authorized to request. The trust broker system 130 makes this determination by accessing a database that stores the permission levels associated with each user or client system 102. In some implementation, access to system resources is controlled by dividing various resources into a plurality of virtual domains. Virtual domains are logical, not physical, groupings of related network data and resources to which some users have access to and others do not. In some implementations, the role of a user or a client system 102 determines which virtual domains they are permitted to access.

In some implementations, the trust broker system 130 maintains an access database of client systems 102, users, and the virtual domains they are authorized to access. For example, in a corporation a programmer would be allowed to access information and resources related to writing and maintaining the code base, but not information and resources related to administrating the human resources department. Thus, the access database would list the programmer as having access to the programming virtual domain but not the human resources administration virtual domain. Thus, in some implementations, when the trust broker system 130 receives a request from a user or a client device 102 for particular data or services, locates the virtual domain that contains the requested information or services and then looks the user up in the access database to determine whether the requesting user or client system 102 is authorized to access that virtual domain.

In some implementations, the trust broker facilitates a "need to know" information model by maintaining a mapping of users, roles and resources. In larger organizations, the trust broker system 130 can also query Identity and Access Management databases (like Oracle) to determine what resources a user is allowed to access based on their role in the company.

In some implementations, in accordance with a determination that the requested clients system 102 or user is authorized to access the requested information or service, the trust broker system 130 determines the server system 140 from the plurality of server systems 140 that contains the information or services requested by the client system 102. Once the trust broker system 130 determines the specific system 140, the trust broker system then determines an associated server agent 150. In some implementations one specific server agent 150 is always associated with a specific server system 140. In other implementations, the specific server agent 150 associated with a particular server system 140 is not fixed and instead the trust broker system 130 chooses a server agent 150 from a plurality of server agents 150 to act as a proxy for the particular server system 140. By changing the server agent 150 that acts as proxy for a given server system 140, the trust broker system 130 ensures that an attacker cannot reliably know which server agent 150 is currently acting as a proxy for the desired server system 140.

In some implementations, the trust broker server 130 assigns an authenticated client system 102 a specific identifier. In some implementations, the identifier is a random value. In other implementations, the identifier is a name or password associated with the client system 102. As noted above, the identifier is changed for each communication session. The trust broker server 130 transmits the encrypted name to the determined server agent 150. The trust broker server 130 also transmits the network address of the determined server agent 150 to the requesting client system 102 via the user agent 108. The client system 102 then initiates an encrypted communication session with a server system 140 via the server agent 150.

In some implementations, the server agent 150-1 is a proxy server distinct from the server system 140. The server agent 150 includes a list of encrypted identifiers validated by the trust broker system 130. In some implementations, when the server agent 150 receives a packet from a client system 102 requesting a communication session the server agent 150 determines whether the packet includes an encrypted identifier and if so, whether the encrypted identifier is among the list of encrypted identifiers validated by the trust broker system 130. In accordance with a determination that the packet either does not include an encrypted identifier or, if it does, that the encrypted identifier is not among the list of authorized client systems 102, the server agent 150 immediately drops the packet, without responding to the system that was the source of the packet. By only responding to packets that include a pre-approved encrypted identifier, the server agent 150 is able to efficiently filter out non-authorized connection attempts and therefore avoid being compromised by certain malicious attacks, such as a distributed denial of service attack (DDOS).

In some implementations, when the server agent 150 determines that initial packet includes an encrypted identifier that corresponds to an authorized client system 102, the server agent 150 opens a secure communication session with the client system 102 and acts as proxy between the client system 102 and the server system 140.

In some implementations, the server agent 150-2 is an application running on the server system 140-2. The server agent 150-2 in this case manages communications between the server system 140-2 and the trust broker system 130, as well as any communications between the server system 140-2 and a user agent 108 at a client system 102. Any communication between the client system 102 and the trust broker system 130, a server agent 150, or a server system 140 is optionally conducted via the user agent 108. Similarly a communication between the server system 140 and a client system or the trust broker system 130 is optionally conducted via a server agent 150.

In some implementations, one or more server systems 140 store data (for example, the work product of attorneys) and provide services (for example an email service or a document backup service) that are accessible over a network. In some implementations, the communication with authorized user agents 108 is conducted through a proxy, such as a server agent 108. In other implementations, the server system 140 communicates with an authorized client system 102 directly through secure communication sessions.

Figure 2:
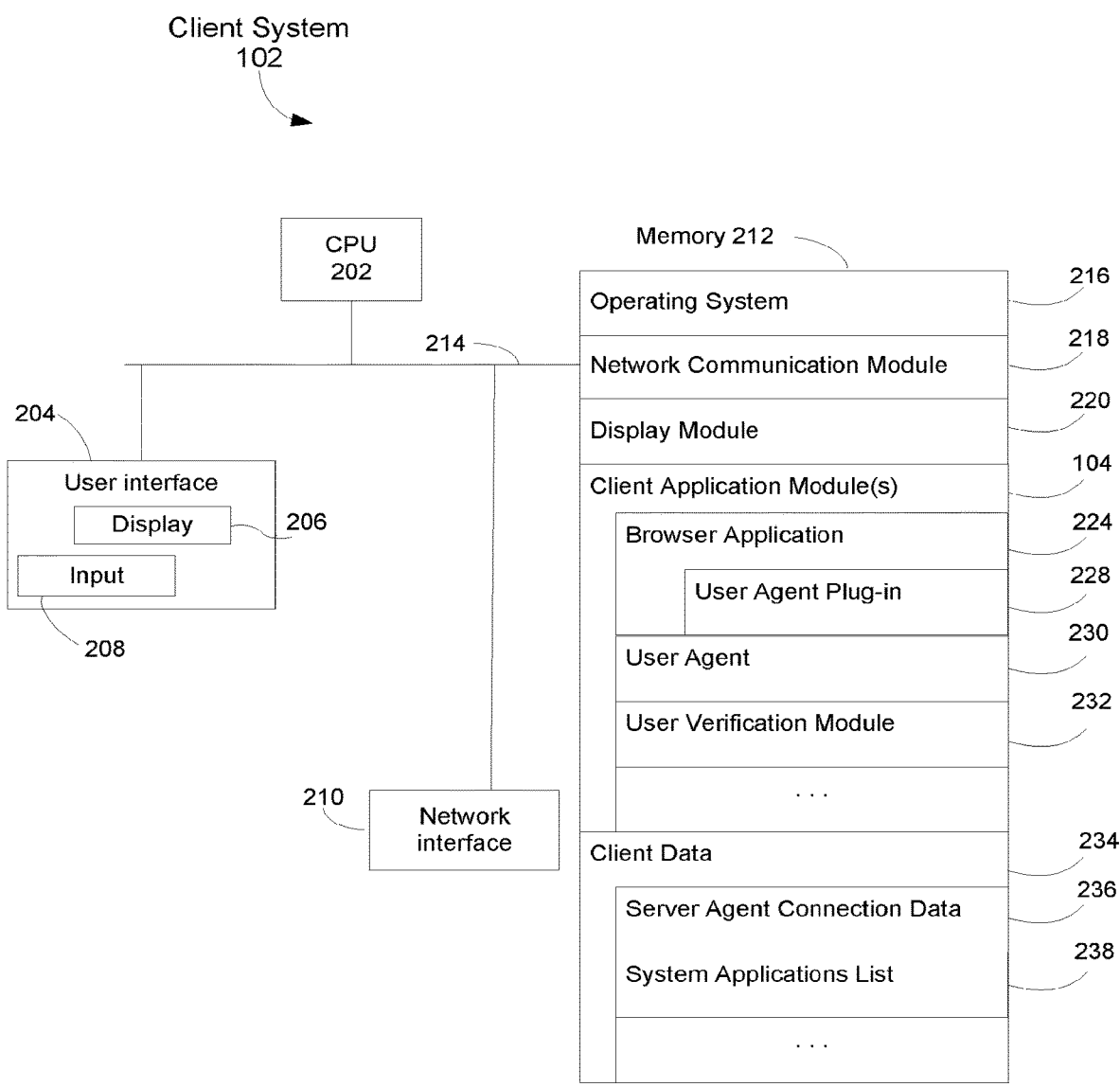
FIG. 2 is a block diagram illustrating a representative client system in accordance with some implementations.

FIG. 2 is a block diagram illustrating a client system 102, in accordance with some implementations. The client system 102 includes one or more processing units (CPU's) 202, one or more network interfaces 210, user interface 204, memory 212, and one or more communication buses 214 for interconnecting these components. The user interface 204 includes an associated display device 204 and optionally includes an input means such as a keyboard, mouse, a touch sensitive display, or other input buttons 208. Optionally, the display device 206 includes an audio device or other information delivery device. Furthermore, some client systems use a microphone and voice recognition to supplement or replace the keyboard.

The memory 212 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 212 optionally includes one or more storage devices remotely located from the CPU(s) 202. In some implementations, the memory 212, or alternately the non-volatile memory device(s) within the memory 212, includes a non-transitory computer-readable storage medium. In some implementations, the memory 212 or the computer-readable storage medium of the memory 212 stores the following programs, modules and data structures, or a superset or subset thereof:

- an operating system 216 that includes procedures for handling various basic system services and for performing hardware dependent tasks;
- a network communication module 218 that is used for connecting the client system 102 to other computers via the one or more communication network interfaces 210 and one or more communication networks (wired or wireless), such as the Internet, other wide area networks, local area networks, metropolitan area networks, and so on;
- a display module 220 for enabling display of content on a display 206 associated with the client system 102;
- one or more client system 102 applications module(s) 104 for enabling the client system 102 to perform the functions offered by the client system 102, including but not limited to:
  - a browser application 224 for sending requests to the trust broker system 130 or a server system 140, and displaying the information (for example web pages) returned by a server system, the browser application optionally including:

a user agent plug-in 228 that enhances the capabilities of the browser application 224 to enable it to perform the tasks of a user agent 230, such as verifying the browser has not been tampered with, verifying the health of the client device 102, managing a secure connection with the trust broker system 130 and/or the server system 140, and forwarding requests from a client application module to the appropriate server agent 150;

a user agent module 230 for verifying the health of the client device 102, managing a secure connection with the trust broker system 130 and/or the server system(s) 140, and forwarding requests from a client application module 104 to the appropriate server agent 150;

a user verification module 232 for verifying the identity of the user of the client system 102 by, for example, requesting a password and/or user identification data; and a client database 234 for storing data related to the client system 102, including but not limited to:

server agent connection data 236, including data necessary to connect to a server agent (FIG. 1, 150) needed to obtain requested data or services, such as the network address for the server agent (FIG. 1, 150) and an encrypted client identifier to identify the client system 102 to the server agent (FIG. 1, 150); and a system application list 238 including data corresponding to the applications currently installed in the client device 102 and/or a system fingerprint representing the list of installed applications.

Figure 3:
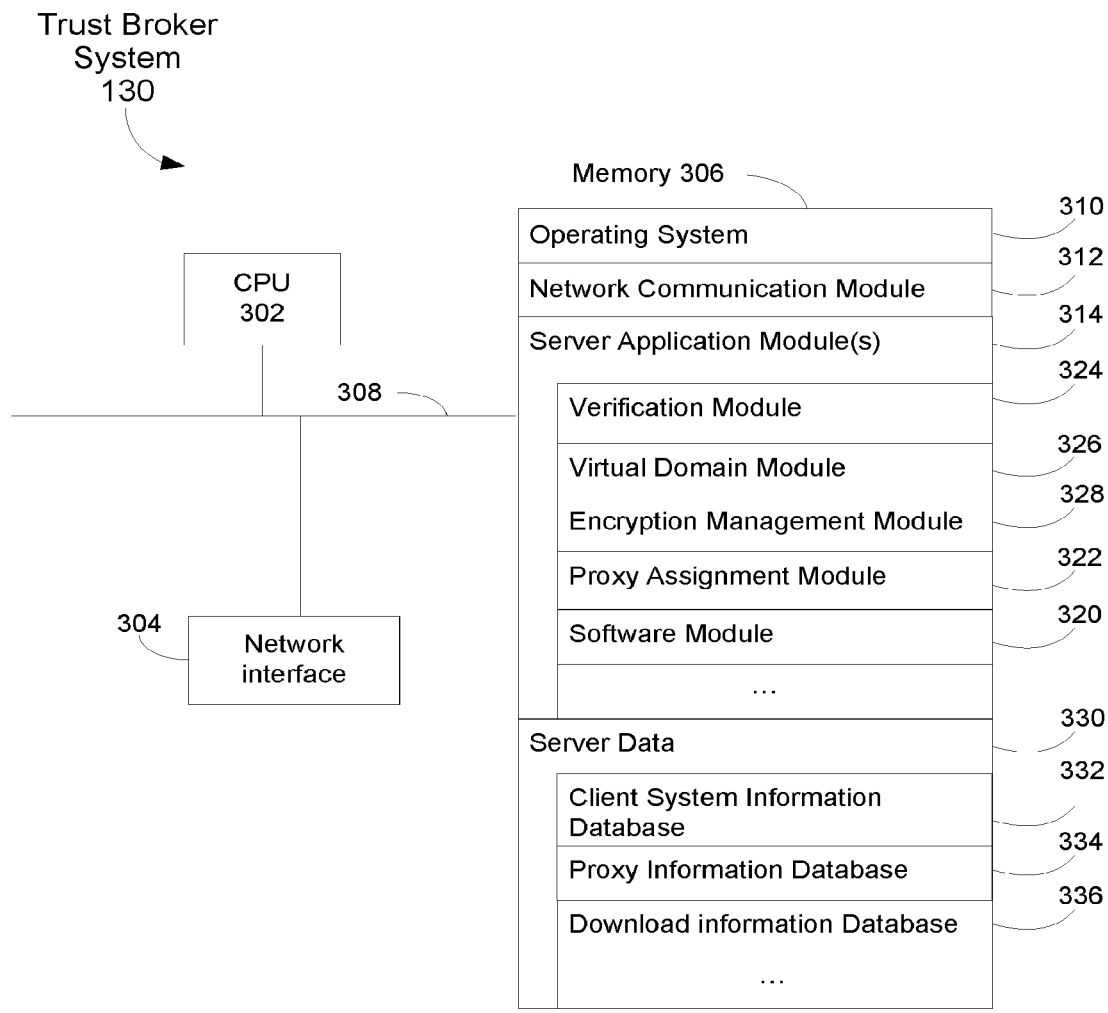
FIG. 3 is a block diagram illustrating a representative trust broker system in accordance with some implementations.

FIG. 3 is a block diagram illustrating a trust broker system 130 in accordance with some implementations. The trust broker system 130 includes one or more processing units (CPU's) 302, one or more network interfaces 304, memory 306, and one or more communication buses 308 for interconnecting these components.

The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 optionally includes one or more storage devices remotely located from the CPU(s) 302. The memory 306, or alternately the non-volatile memory device(s) within the memory 306, includes a non-transitory computer-readable storage medium. In some implementations, the memory 306 or the computer-readable storage medium of the memory 306 stores the following programs, modules and data structures, or a superset or subset thereof:

an operating system 310 that includes procedures for handling various basic system services and for performing hardware dependent tasks;

a network communication module 312 that is used for connecting the trust broker system 130 to other computers via the one or more communication network interfaces 304 (wired or wireless) and one or more communication networks, such as the Internet, other wide area networks, local area networks, metropolitan area networks, and so on;

one or more server application module(s) 314 for enabling the trust broker system 130 to perform the functions offered by the trust broker system 130, such as:

a verification module 324 for verifying the integrity and identity of client systems (FIG. 1, 102), attempting to connect to the trust broker system 130, and determining whether the client system is physically located in an approved geographic location;

a virtual domain module 326 for determining what network resources are available to which client systems (and users of those client systems) based on criteria such as the role of the client system 102, the role of the user of the client system, the location of the client system, and the integrity of the client system;

an encryption management module 328 for creating and distributing per session encryption keys (PSKs) used to established secure communication sessions and for establishing encrypted identifiers or names that client systems (FIG. 1, 102) use to authenticate themselves to the server agent (FIG. 1, 150);

a proxy assignment module 322 for determining out of a plurality of potential proxy systems a particular system associated with a given server system (FIG. 1, 140) and in some implementations, periodically changing the proxy system associated with a particular server system (FIGS. 1, 140); and a software module 320 to verify the identity or role of a user, the integrity of a client system by querying an external system such as an identity data base or multi-factor authentication server; and one or more server database(s) 330 for storing data related to the trust broker system 130, such as:

a client system information database 332 for including data for determining whether a particular client system (FIG. 1, 102): is authorized to connect to the system, has not been altered, is being used by an approved user, and is within predetermined geographical boundaries;

a proxy information database 334 including data describing the proxy servers available to the trust broker system 130 and to which server systems (FIG. 1, 140) a particular proxy server is associated; and a download information database 336 including information describing which applications need to be installed on particular client systems (FIG. 1, 102), especially for zero state systems where all necessary data and application software needs to be downloaded each time it comes online.

In accordance with some implementations, the trust broker system (FIG. 1, 130) receives a request from a user agent associated with a client system remote from the trust broker to connect with applications and resources associated with the trust broker (402). In response to the request to connect with a server system (FIG. 1, 140), the trust broker system (FIG. 1, 130) verifies the integrity of the client system (FIG. 1, 102). This can be accomplished in many ways. For example, the trust broker system scans or causes the user agent (FIG. 1, 108) to scan the client system for malicious software.

In some implementations, verifying the integrity of the client system includes verifying the identity of a user of the client system. The trust broker system receives a unique user identifier from the user agent such as a user id and password. The trust broker system determines, based on the unique user identifier, the identity of the requesting user. For example, the trust broker system includes a database matching users of the system with their respective user identifiers. By looking up the received user identifier in the database, the trust broker system 130 can determine the identity of the user.

In some implementations, the trust broker system receives, from the user agent, a generated system fingerprint for the client system. The trust broker system determines, based on the generated system fingerprint, the specific device that is currently executing the user agent. In some implementations, the trust broker system determines the geographic location of the client system.

In some implementations, the trust broker system determines the access level permitted to the identified user. Based on the access level of the user, the trust broker system determines whether the identified user is authorized to receive the requested material.

In some implementations, the trust broker system establishes a connection with the user agent. In some implementations, the trust broker system transmits session information to the server system that provides the requested applications and resources, where the transmitted session information identifies the requesting user agent. The server system then uses the transmitted session information to evaluate client systems requesting connection with the server system. For example, when a request to connect is received by the server system, the server system 140 can use the transmitted session information to determine whether the request is from a legitimate source.

In some implementations, the trust broker system sends the user agent connection information, where the connection information enables the requesting user agent to connect to the requested server system. The connection information includes a network address for a server system (or a proxy for the server system) and an encrypted identifier to identify the client system to the server system.

In some implementations, the server system receiving a first encrypted user identifier from a trust broker system associated with the server system, the first encrypted user identifier including information identifying a user of a client system verified by the trust broker system. In some implementations the encrypted user identifier is a random number assigned to the client system for a single communication session and is thus the equivalent of an encrypted value. The server system receives a connection request from a first client system.

In some implementations, the server system receives a second encrypted user identifier from the first client system. In some implementations, the encrypted user identifier is included with the connection request, as a single communication packet. In some implementations, the server system determines whether the first encrypted user identifier matches the second encrypted user identifier. In some cases, the server system has a white list of a plurality of client systems authorized to request information and services from the server system. In some implementations, the trust broker system notifies the server system when a particular encrypted user identifier is no longer valid. In other implementations, all encrypted user identifiers automatically expire after a predetermined amount of time.

In some implementations, the server system determines the access level permitted to the identified user. In some implementations, this determination is done in accordance with the role of the client system or the role of the user associated with the client system. The server system then determines whether the identified user is authorized to connect to the requested server system based on the determined access level permitted to the identified user.

In some implementations, in accordance with a determination that the user is not authorized to connect to the requested server system, the server system terminates the connection with the user agent. The server system then sends a lack of authorization notice to the requesting user agent.

In some implementations, in accordance with a determination that the first encrypted user identifier matches the second encrypted user identifier, the server system establishes an encrypted connection with the first client system. The server system then uses this connection to transmit the request data or service to the client system. In some implementations, in accordance with a determination that first encrypted user identifier does not match the second encrypted user identifier, the server system discards the received packet, without replying to the first client system.

In some implementations, the trust broker system receives a request to connect to a server system from a previously authorized client system, where the client system has an associated user agent. In some implementations, the trust broker system determines the machine fingerprint associated with the client system, where the fingerprint is a digital value that represents all software installed on the client system. For example, in some implementations the digital value is a hash value from performing a hash function on a list of applications installed on the client system. In some implementations, the trust broker system receives the machine fingerprint from a trusted platform module chip on the client system.

In some implementations, the trust broker system determines whether the client system has software installed since the previous authorization based on the received machine fingerprint. In accordance with a determination that the client system does not have newly installed software, the trust broker system transmits instructions to evaluate the newly installed software. The trust broker system receiving the results of the evaluation from the client system.

In some implementations, the trust broker system determines whether the received results indicate that the newly install software includes malicious code. In accordance with a determination that the newly installed software includes malicious code, the trust broker system terminates the connection with the client system.

In some implementations, the trust broker system notifies the client system that the newly installed software includes malicious code. In some implementations, the trust broker system sends a command to the client system that initiates a process to remove the malicious code from the client system. In accordance with a determination that the client system does not have newly installed software, the trust broker system determines that the client system is secure.

In some implementations, the client device connects to a trust broker system upon start-up of the device, where the device is not enabled to connect to any other system. For example, an electronic device, such as a video game console, may be configured to only be able to connect to a network address associated with the manufacturer of the console upon start up. In some implementations, the client device does not store any state information. The client device transmits information identifying the stateless electronic device to the trust broker system.

In some implementations, the client device receives, from the trust broker system, information that enables the client device to connect to a server system, where the trust broker system determines the appropriate server system based on the client device.

In some implementations, the client device downloading, from the server system, further instructions for performing the one or more tasks associated with the client device, where the downloaded instructions are only retained for the current session. In some implementations, the client device no critical network access information is stored at the client device.

In some implementations, the server system stores encrypted identifying information for a plurality of client systems authorized to interact with the server system, where the encrypted identifying information is changed per client system per session. In some implementations, the server system creates a plurality of virtual domains; each virtual domain representing a set of services and information distinct from the other virtual domains.

In some implementations, the server system stores permissions associated with each respective client system in the plurality of client system, where the stored permissions indicate the virtual domains accessible to the respective client systems. In some implementations, the server system receives a request from a first client system, including encrypted identifying information associated with the first client system, for information associated with a first virtual domain. The encrypted identifying information allows the client system to identify itself to the trust broker system without having to rely on values that may vary over time, such as an IP address. If someone is accessing the network from a mobile device while riding a bus, for example, the IP address will change as the bus moves around. The encrypted identifying information stays constant and will allow the trust broker system to reliable identity various client systems.

In some implementations, the server system retrieves stored permissions of the first client system based on the received encrypted identifying information. In some implementations, the server system determines, based on the stored permissions associated with the first client system, whether the first client system is permitted to access the requested first virtual domain. In some implementations, the server system determines a current geographic location of the client system. If the client system is outside of a predetermined geographical area, the server system rejects the client system's request for information.

In some implementations, in accordance with a determination that the first client system is not permitted to access the requested first virtual domain, the server system rejections the first client's request for information associated with the first virtual domain. The server system then notifies the first client system of the rejection.

In some implementations, in accordance with a determination that the first client system is permitted to access the requested first virtual domain, the server system transmits the requested information to the first client system. In some implementations, communications between the server system and the client system are encrypted. In some implementations, the permissions are associated with a user of the first client system. In some implementations, the permissions associated with the user are based on the user's role.

In some implementations, the trust broker system receives a request to connect to applications and resources from a client system. The trust broker system determines whether the client system is authorized to connect to the requested applications and resources. In some implementations, in response to determining the client system has authorization to connect to the requested applications and resources, the trust broker system determines, from a plurality of potential proxy servers, a proxy server associated with the requested server system.

In some implementations, the trust broker system determines a proxy server associated with the requested server system by determining a specific server system associated with the requested applications and resources by examining a lookup table stored on the trust broker system. In some implementations, the trust broker system determines a proxy server associated with the requested server system by determining the proxy server currently associated with the determined server system.

In some implementations, the trust broker system determines whether the client system is authorized to connect to the requested applications and resources by determining the identity of a user associated with the client system and determining whether the user associated with the client system is authorized to access the requested applications and resources.

In some implementations, the trust broker system transmits an identification value for the client system to the requested server system. The trust broker system transmits the identification value to the client system. The identification value transmitted to a proxy server is an encrypted value associated with the client system.

In some implementations, the trust broker system transmits contact information for the determined proxy server to the client system, where all communication between the client system and the requested server system passes through the proxy server. In some implementations, the trust broker system periodically changes the proxy server associated with each server system associated with the trust broker system.

Figure 4A:
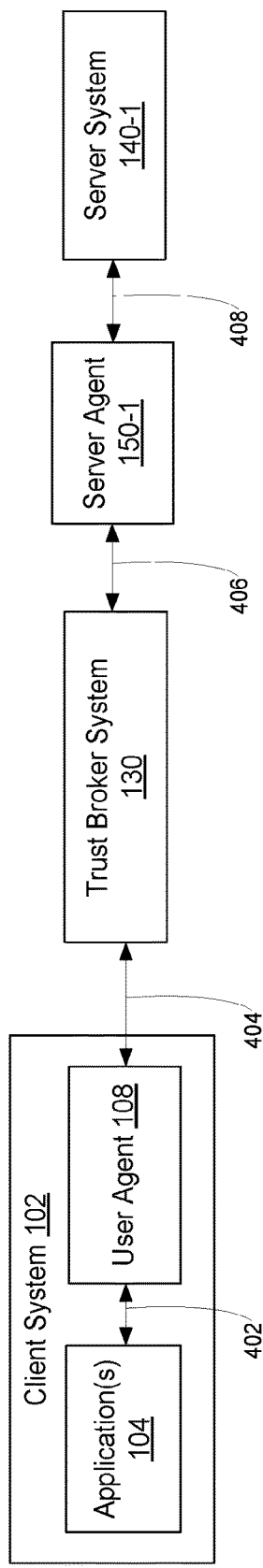
FIGS. 4A-4C are block diagrams illustrating representative communication channels in accordance with some implementations.
Figure 4B:
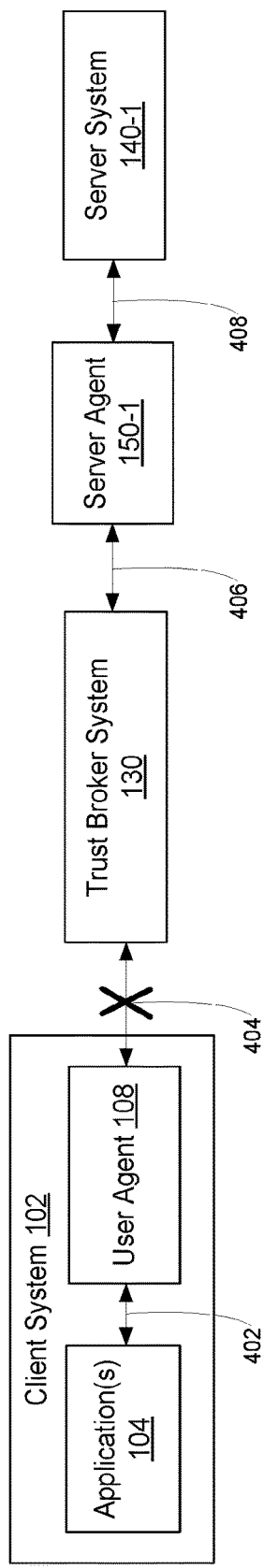
Figure 4C:
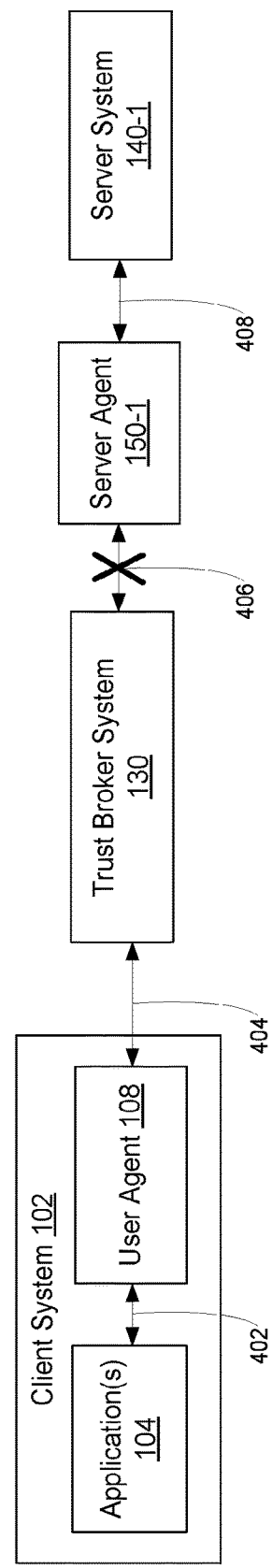

FIGS. 4A-4C are block diagrams illustrating representative communication channels in accordance with some implementations. FIG. 4A shows a communication channel between the client system 102 and the server system 140-1 via a user agent 108, a trust broker system 130, and a server agent 150-1. The communication channel between the client system 102 and the server system 140-1 includes: (1) a first portion 402 between the application(s) 104 and the user agent 108; (2) a second portion 404 between the user agent 108 and the trust broker system 130; (3) a third portion 406 between the trust broker system 130 and the server agent 150-1; and (4) a fourth portion 408 between the server agent 150-1 and the server system 140-1. In some implementations, a command or request sent via the communication channel is acknowledged by each component along the channel. For example, receipt of a command issued by an application 104 is acknowledged by the user agent 108, which then sends the command to the trust broker system 130. The trust broker system 130 in turn acknowledges receipt from the user agent 108 and sends the command to the server agent 150-1. The server agent 150-1 acknowledges receipt from the trust broker system 130 and sends the command to the server system 140-1.

FIG. 4B shows the communication channel with a failure in the second portion 404. In some instances, the failure may be the result of a particular network going offline, a server switching to a new network, an unacceptably high latency for a particular network, or the like. For example, a failure in the second portion 404 may be due to the client system 102 transitioning from a wireless network, such as a WiFi network, to a cellular network, such as a 4G network. In accordance with some implementations, the other portions of the communication channel (e.g., first portion 402 and fourth portion 408) are maintained while the user agent 108 and/or the trust broker system 130 reestablish the second portion 404.

In some implementations, the communication channel utilizes an acknowledgement protocol, such as Transmission Control Protocol (TCP), and maintaining a portion of the communication channel includes acknowledging commands and/or requests sent from the client system 102 at the user agent 108. By acknowledging the commands and/or requests sent from the client system 102 at the user agent 108 the first portion 402 of the connection can be maintained while the second portion 404 is reestablished. Similarly, in accordance with some implementations, commands and/or requests sent by the server system 140-1 are acknowledged by the server agent 150-1, thus maintaining the fourth portion 408 of the connection.

FIG. 4C shows the communication channel with a failure in the third portion 406. In some instances, the failure may be the result of a particular network going offline, a server switching to a new network, an unacceptably high latency for a particular network, or the like. In accordance with some implementations, the other portions of the communication channel (e.g., first portion 402 and fourth portion 408) are maintained while the user agent 108 and/or the trust broker system 130 reestablish the third portion 406. In some implementations, maintaining the first portion 402 and/or the fourth portion 408 until the third portion 406 is reestablished enables the user of the client system 102 to bypass lengthy validation/authentication procedures, as discussed previously with regards to establishing secure connections.

Figure 5A:
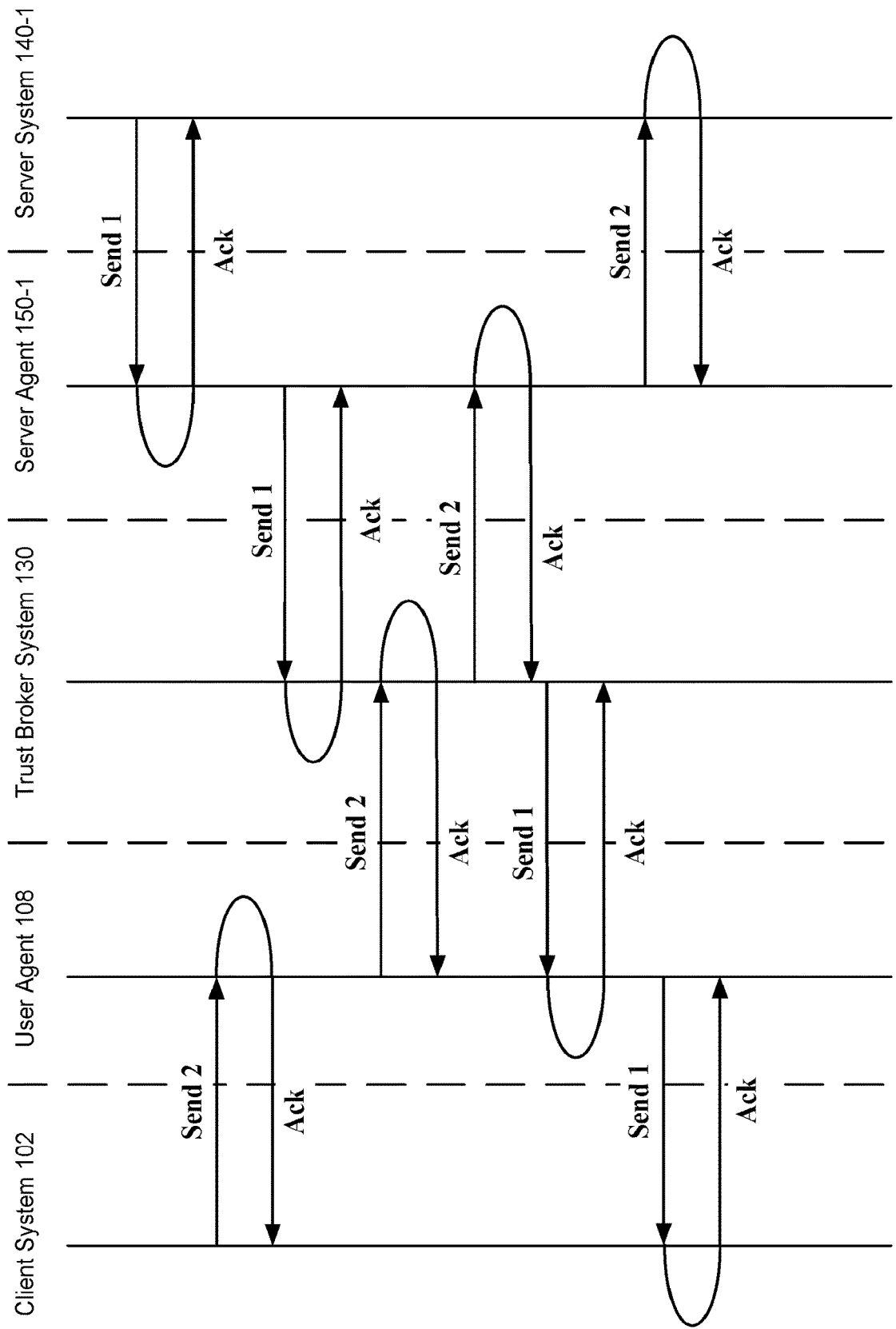
FIGS. 5A-5C are flow diagrams illustrating representative communication processes in accordance with some implementations.
Figure 5B:
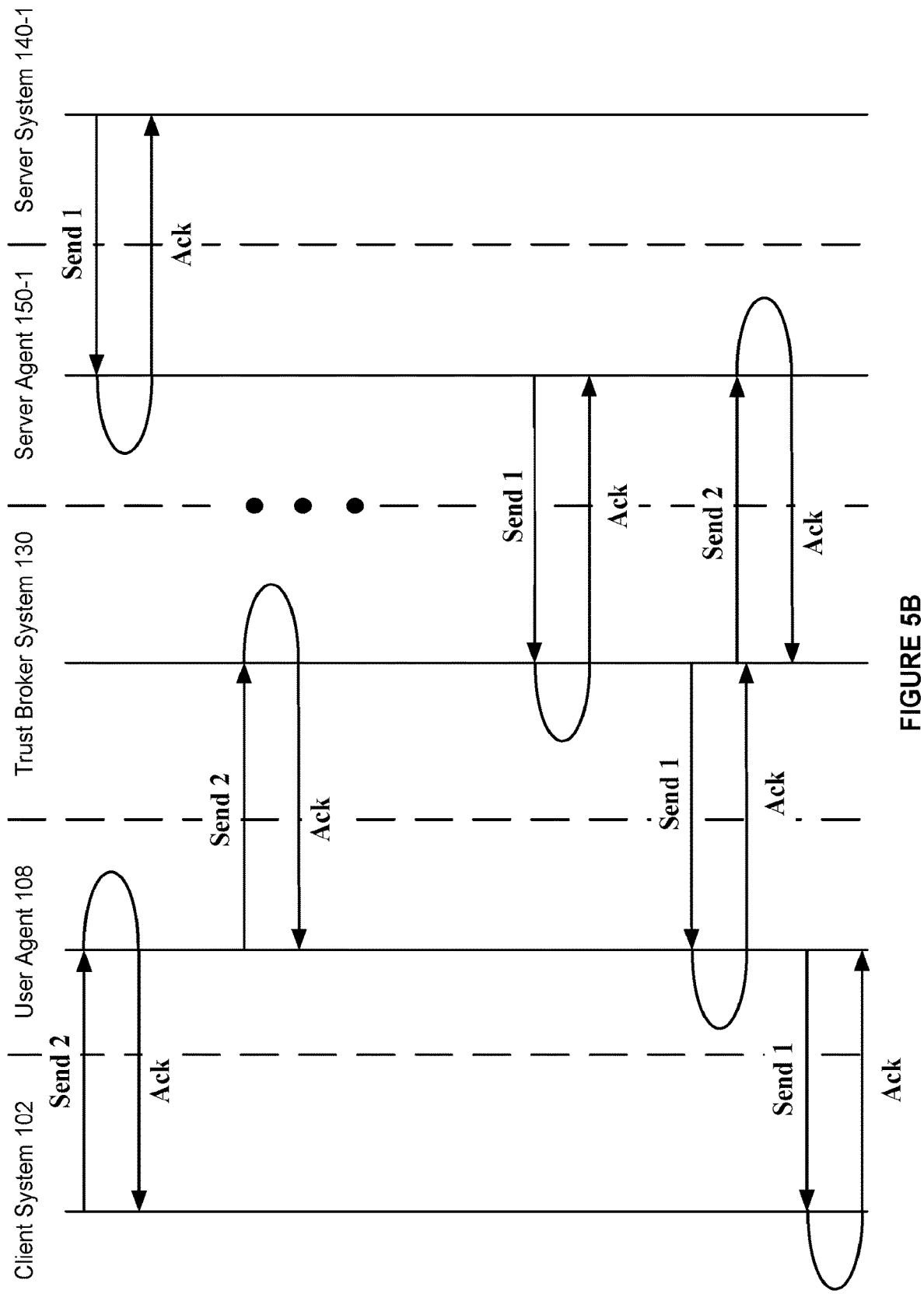
Figure 5C:
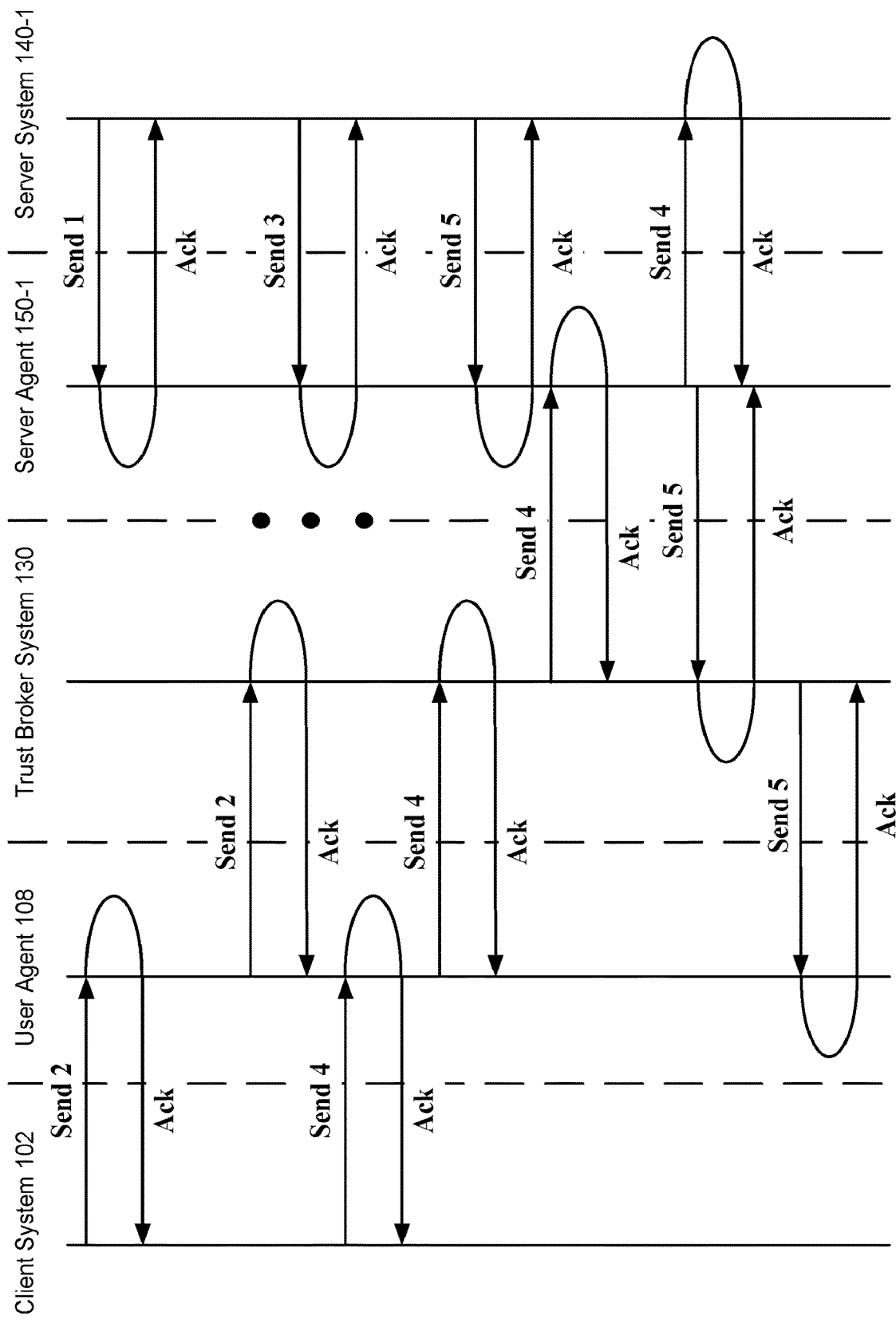

FIGS. 5A-5C are flow diagrams illustrating representative communication processes in accordance with some implementations. FIG. 5A shows a representative communication process where there are no communication failures or disruptions. As shown in FIG. 5A a packet (e.g., a request, command, or response) labeled "Send 1" is sent from the server system 140-1 to the client system 102. The "Send 1" packet is received and acknowledged by the server agent 150-1 and sent from the server agent to the trust broker system 130. The "Send 1" packet is then received and acknowledged by the trust broker system and sent from the trust broker system 130 to the user agent 108. The "Send 1" packet is then received and acknowledged by the user agent and sent from the user agent 108 to the client system 102, which also acknowledges receipt. Similarly, a packet labeled "Send 2" is sent from the client system 102 to the server system 140-1 and is acknowledged at each component along the channel. In some implementations, the user agent 108 and the server agent 150 acknowledge receipt of packets, but the trust broker system 130 does not acknowledge receipt.

FIG. 5B shows a representative communication process where a temporary communication failure occurs between the server agent 150-1 and the trust broker system 130. In the example illustrated by FIG. 5B communication packets are not lost as a result of a temporary communication failure. As shown in FIG. 5A a packet labeled "Send 1" is sent from the server system 140-1 and intended for the client system 102. The "Send 1" packet is acknowledged by the server agent 150-1 upon receipt of the packet, but is not sent to the trust broker system 130 until the temporary communication failure is resolved. Similarly, the "Send 2" packet from the client system 102 is acknowledged by the trust broker system 130 upon receipt of the packet, but is not sent to the server agent 150-1 until the communication link is restored. In some implementations, the server agent 150-1 locally stores the "Send 1" packet until communication with the trust broker system 130 is re-established. In some implementations, the trust broker system 130 locally stores the "Send 2" packet until communication with the server agent 150-1 is re-established.

In some implementations, the client system 102 and/or the server system 140-1 are unaware of the temporary communication failure (e.g., because the packets sent continue to be acknowledged by the corresponding agents).

FIG. 5C shows a representative communication process where a temporary communication failure occurs between the server agent 150-1 and the trust broker system 130. In the example illustrated by FIG. 5C communication packets are lost as a result of a temporary communication failure. As shown in FIG. 5C a packet labeled "Send 1" is sent from the server system 140-1 and intended for the client system 102. The "Send 1" packet is acknowledged by the server agent 150-1 upon receipt of the packet, but is not sent to the trust broker system 130 due to the communication failure. Similarly, the "Send 3" packet is acknowledged but not sent by the server agent 150-1. The "Send 5" packet is received by the server agent 150-1 after communications with the trust broker system 130 have been reestablished and is sent from the server agent 150-1 to the trust broker system 130 and on to the user agent 108 and the client system 102. Thus, the "Send 1" and "Send 3" packets are not received by the client system 102 (e.g., lost), but the "Send 5" packet is received.

FIG. 5C also shows the "Send 2" packet from the client system 102 being acknowledged by the trust broker system 130 upon receipt of the packet, but not being sent to the server agent 150-1. The "Send 4" packet is received by the trust broker system 130 after communications with the server agent 150-1 have been reestablished and is sent from the trust broker system 130 to the server agent 150-1 and on to the server system 140-1. Thus, the "Send 2" packet is not received by the server system 140-1 (e.g., lost), but the "Send 4" packet is received.

Figure 6A:
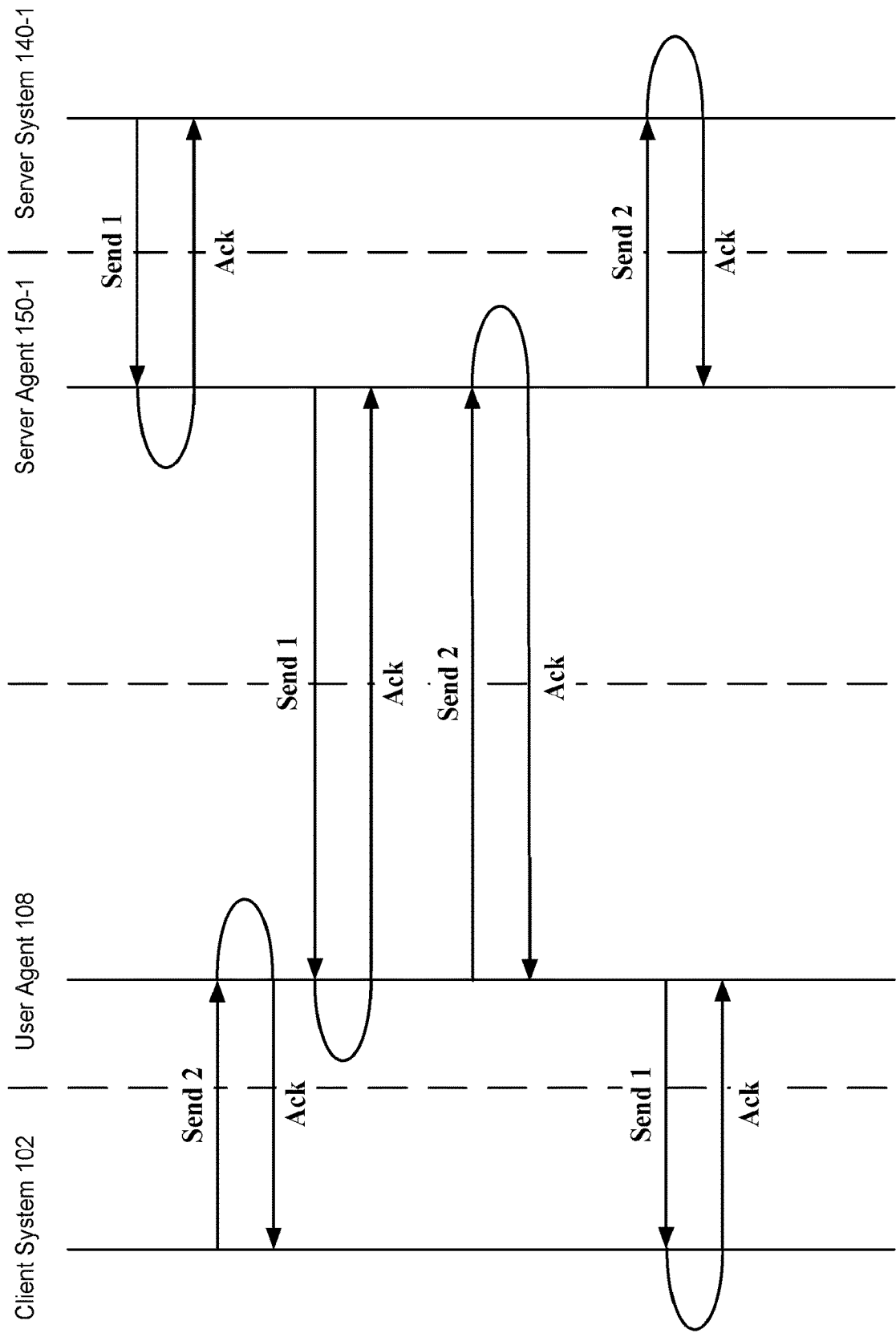
FIGS. 6A-6C are flow diagrams illustrating representative communication processes in accordance with some implementations.
Figure 6B:
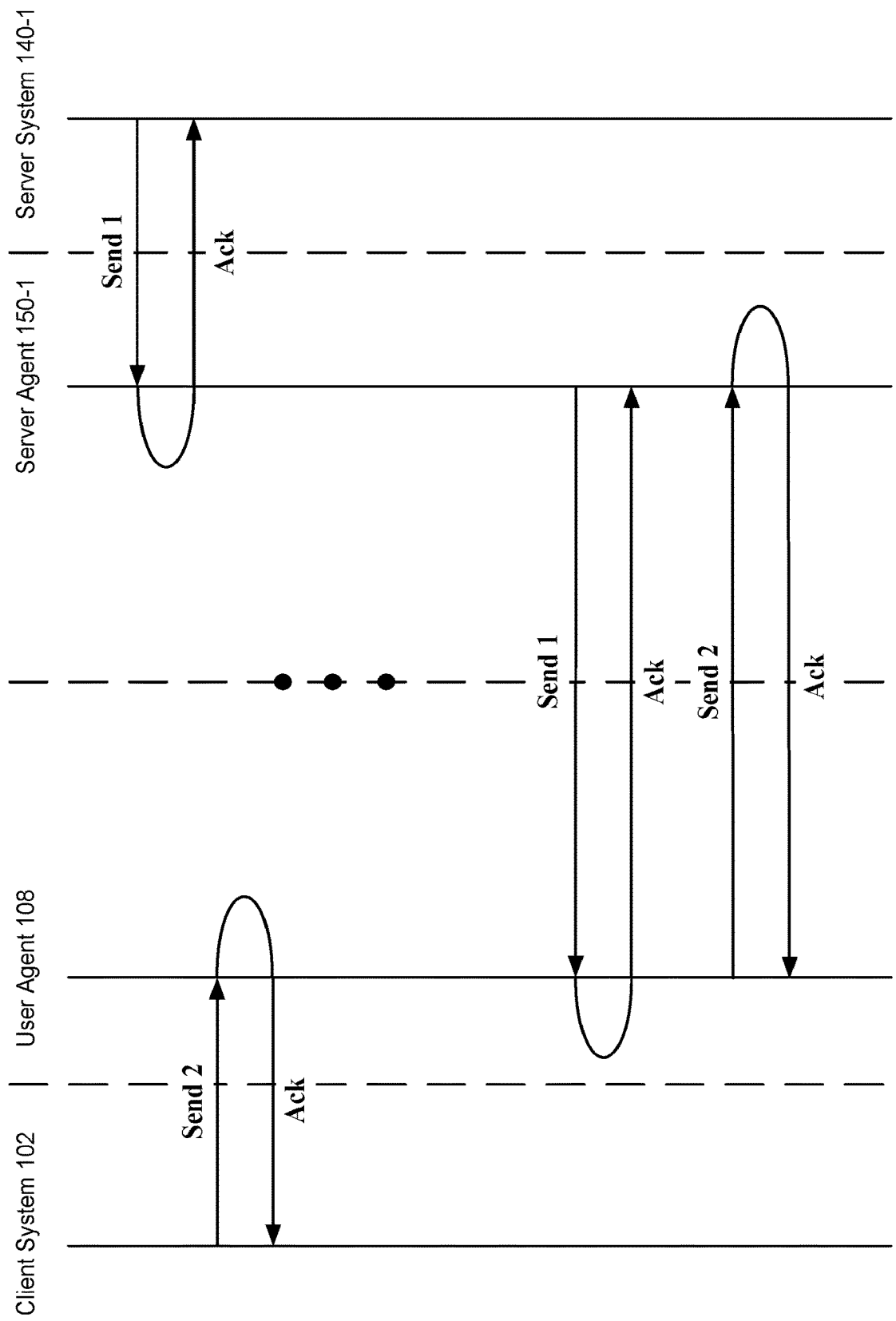
Figure 6C:
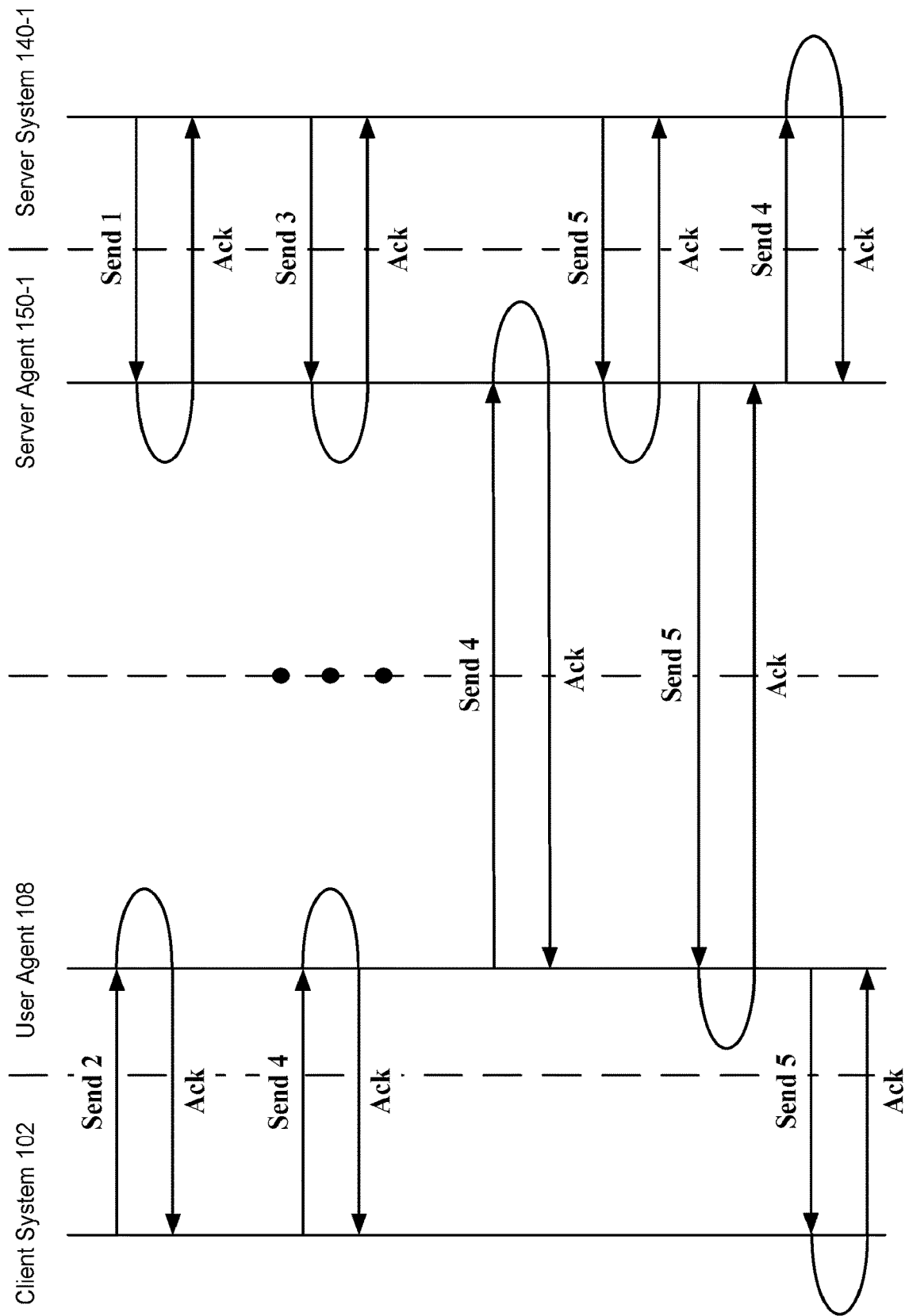

FIGS. 6A-6C are flow diagrams illustrating representative communication processes in accordance with some implementations. FIG. 6A shows a representative communication process where there are no communication failures or disruptions, similar to the processes shown in FIG. 5A except without receipt and acknowledgement of communications by a trust broker system. As shown in FIG. 6A a packet (e.g., a request, command, or response) labeled "Send 1" is sent from the server system 140-1 to the client system 102. The "Send 1" packet is received and acknowledged by the server agent 150-1 and sent from the server agent to the user agent 108. The "Send 1" packet is then received and acknowledged by the user agent and sent from the user agent 108 to the client system 102, which also acknowledges receipt. Similarly, a packet labeled "Send 2" is sent from the client system 102 to the server system 140-1 and is acknowledged at each component along the channel. In some implementations, the communication packets pass through a trust broker system 130, but are not acknowledged by the trust broker system.

FIG. 6B shows a representative communication process where a temporary communication failure occurs between the server agent 150-1 and the user agent 108. In the example illustrated by FIG. 6B communication packets are not lost as a result of a temporary communication failure. As shown in FIG. 6A a packet labeled "Send 1" is sent from the server system 140-1 and intended for the client system 102. The "Send 1" packet is acknowledged by the server agent 150-1 upon receipt of the packet, but is not sent to the user agent 108 until the temporary communication failure is resolved. Similarly, the "Send 2" packet from the client system 102 is acknowledged by the user agent 108 upon receipt of the packet, but is not sent to the server agent 150-1 until the communication link is restored. In some implementations, the server agent 150-1 locally stores the "Send 1" packet during the communication failure and/or the user agent 108 locally stores the "Send 2" packet during the communication failure. In some implementations, the client system 102 and/or the server system 140-1 are unaware of the temporary communication failure (e.g., because the packets sent continue to be acknowledged by the corresponding agents).

FIG. 6C shows a representative communication process where a temporary communication failure occurs between the server agent 150-1 and the user agent 108. In the example illustrated by FIG. 6C communication packets are lost as a result of a temporary communication failure. As shown in FIG. 6C a packet labeled "Send 1" is sent from the server system 140-1 and intended for the client system 102. The "Send 1" packet is acknowledged by the server agent 150-1 upon receipt of the packet, but is not sent to the user agent 108 due to the communication failure. Similarly, the "Send 3" packet is acknowledged but not sent by the server agent 150-1. The "Send 5" packet is received by the server agent 150-1 after communications with the user agent 108 have been reestablished and is sent from the server agent 150-1 to the user agent 108 and on to the client system 102. Thus, the "Send 1" and "Send 3" packets are not received by the client system 102 (e.g., lost), but the "Send 5" packet is received.

FIG. 6C also shows the "Send 2" packet from the client system 102 being acknowledged by the user agent 108 upon receipt of the packet, but not being sent to the server agent 150-1. The "Send 4" packet is received by the user agent 108 after communications with the server agent 150-1 have been reestablished and is sent from the user agent 108 to the server agent 150-1 and on to the server system 140-1. Thus, the "Send 2" packet is not received by the server system 140-1 (e.g., lost), but the "Send 4" packet is received.

Figure 7:
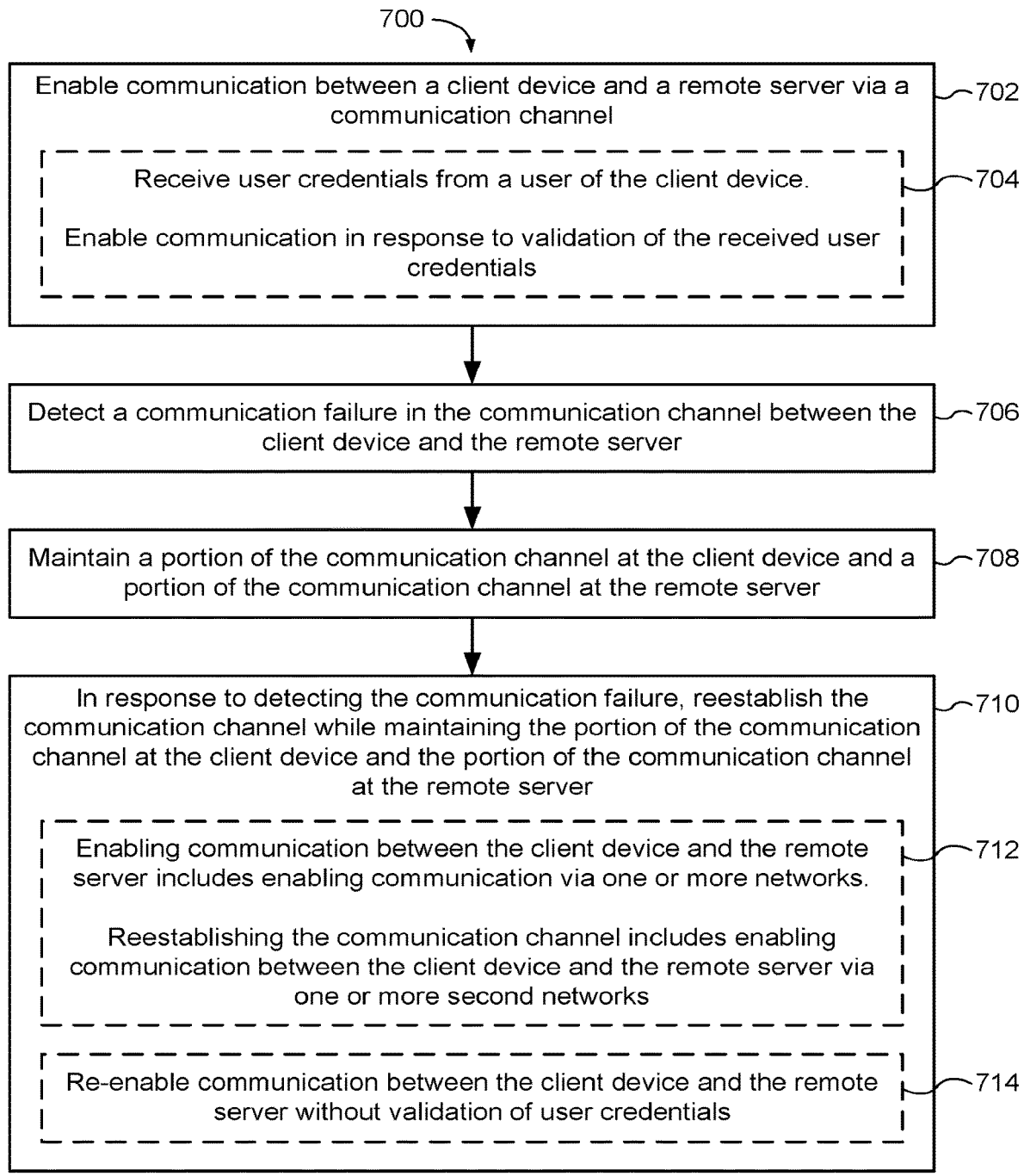
FIG. 7 is a flow diagram illustrating a representative method for maintaining a communication channel in accordance with some implementations.

FIG. 7 is a flow diagram illustrating a representative method 700 for maintaining a communication channel in accordance with some implementations.

In some implementations, the method 700 is performed by: (1) one or more electronic devices of one or more systems, such as the trust broker system 130; (2) one or more connection agents, such as user agent 108 and server agent (s) 150; or (3) a combination thereof. Thus, in some implementations, respective operations of the method 700 are performed by any of the aforementioned devices, systems, or combination of devices and/or systems. In some implementations, method 700 is governed by instructions that are stored in a non-transitory computer-readable storage medium and that are executed by one or more processors of a device and/or computing system, such as the one or more CPU(s) 302 of the trust broker system 130 and/or the one or more CPU(s) 102 of the client system 102. For convenience, method 700 will be described below as being performed by a computing system, including a client agent, such as user agent 108, and a communications server, such as trust broker 130, FIG. 1.

The computing system enables (702) communication between a client device and a remote server via a communication channel. For example, a trust broker system 130 (e.g., via network communication module 312) enables communication between a client device and a remote server. In some implementations, enabling communication comprises enabling secure communication between the client device (e.g., client system 102) and the remote server (e.g., server system 140-1). In some implementations, enabling communication comprises enabling encrypted communication between the client device (e.g., client system 102) and the remote server (e.g., server system 140-1). In some implementations, enabling communication comprises establishing communication between the client device and the remote server using a communication protocol, such as an acknowledgement protocol. In some implementations, enabling communication comprises establishing a TCP connection between the client device and the remote server. In some implementations, the communication channel spans multiple networks including one or more wireless networks, such as WiFi or 4G networks, and/or one or more wired networks. In some implementations, enabling communication comprises establishing communication between the client device and the remote server via one or more proxy servers. In some implementations, enabling communication between the client device and the remote server includes enabling the client device to access applications and resources stored at the remote server.

In some implementations, the computing system receives (704) user credentials from a user of the client device, and enables communication in response to validation of the received user credentials. In some implementations, the computing system receives validation information from the client device, and enables the communication in response to validation of the client device and/or the user of the client device. In some implementations, the validation information includes one or more of: geographical location information for the client device, a software and/or hardware fingerprint of the client device, a unique device ID for the client device, a unique user ID for the user of the client device, virus scan information, and the like. In some implementations, enabling communication includes establishing a secure connection as discussed above with regards to FIGS. 1-3.

The computing system detects (706) a communication failure in the communication channel between the client device and the remote server. In some implementations, detecting a communication failure comprises determining that one or more communications were not received and/or acknowledged. In some implementations, detecting a communication failure comprises determining that a latency of the communication channel exceeds a predetermined threshold. In some implementations, detecting a communication failure comprises receiving a communication from a network component indicating that it is going offline. In some implementations, detecting a communication failure comprises detecting a communication failure between a client agent and a trust broker system (e.g., portion 404 in FIG. 4B). In some implementations, detecting a communication failure comprises detecting a communication failure between a server agent and a trust broker system (e.g., portion 406 in FIG. 4C). In some implementations, detecting a communication failure comprises detecting a communication failure between a server agent and a user agent.

The computing system maintains (708) a portion of the communication channel at the client device and a portion of the communication channel at the remote server. For example, in FIG. 4B, the first portion 402 between the application(s) 104 and the user agent 108 and the fourth portion 408 between the server agent 150-1 and the server system 140-1 are maintained during a communication failure in portion 404 of the communication channel. In some implementations, maintaining the portion of the communication channel at the client device comprises maintaining a portion of the communication channel between the client device and a client agent. In some implementations, the client agent maintains the portion of the communication channel by acknowledging communications received from the client device via the communication channel. In some implementations, the client agent is a component of the client device. In some implementations, the client agent is distinct from the client device. In some implementations, maintaining the portion of the communication channel at the remote server comprises maintaining a portion of the communication channel between the remote server and a server agent. In some implementations, the server agent maintains the portion of the communication channel by acknowledging communications received from the remote server via the communication channel. In some implementations, the server agent is distinct from the remote server. In some implementations, the server agent is a component of the remote server.

In response to detecting the communication failure, the computing system reestablishes (710) the communication channel while maintaining the portion of the communication channel at the client device and the portion of the communication channel at the remote server. In some implementations, the communications server reestablishes the communication channel while the client agent and server agent maintain their portions. In some implementations, reestablishing the communication channel comprises reconnecting to the particular network that failed. In some implementations, reestablishing the communication channel comprises bypassing to the particular network that failed. In some implementations, reestablishes the communication channel includes forwarding (e.g., from the user agent and/or the server agent) one or more previously-acknowledged communication packets.

In some implementations, enabling communication between the client device and the remote server includes (716) enabling communication via one or more networks, and reestablishing the communication channel includes enabling communication between the client device and the remote server via one or more second networks. For example, the client system 102 is initially connected via a WiFi network and communication is reestablished via a cellular network.

In some implementations, the computing system re-enables (714) communication between the client device and the remote server without validation of user credentials. In some implementations, the computing system re-enables communication between the client device and the remote server without requiring validation information from the client device (e.g., device fingerprints, virus scans, user authentication, etc.). In some implementations, the computing system re-enables communication between the client device and the remote server in response to an abbreviated validation process. For example, the computing system re-enables communication between the client device and the remote server in response to validation of the user agent and/or the server agent, but without revalidating a user of the client device.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first user could be termed a second user, and, similarly, a second user could be termed a first user, without departing from the scope of the present implementations. The first user and the second user are both users, but they are not the same user.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method, comprising
   detecting, by a network device, a communication failure associated with a communication channel between a client device and a server device, the communication failure being in at least one of:
      a first portion of the communication channel between the client device and the network device, or
      a second portion of the communication channel between the network device and the server device, and
   wherein the communication failure is a result of at least one of:
      a network going offline,
      a server switching to a new network, or
      detecting a networking metric does not meet a threshold metric;
   receiving, by the network device and from at least one of the client device or the server device, one or more network packets to be sent via the communication channel;
   selectively:
      providing, by the network device, during the communication failure, and when the one or more network packets are received from the client device, the client device with one or more client acknowledgments that correspond to each of the one or more network packets,
         the one or more client acknowledgments providing the client device with no indication of the communication failure, or
      providing, by the network device, during the communication failure, and when the one or more network packets are received from the server device, the server device with one or more server acknowledgments that correspond to each of the one or more network packets,
         the one or more server acknowledgments providing the server device with no indication of the communication failure;

maintaining, by the network device and during the communication failure, the communication channel; and
reestablishing communications, by the network device and via the communication channel, while maintaining the communication channel.

2. The method of claim 1, wherein reestablishing the communications comprises:
bypassing at least one of a validation procedure or an authentication procedure when reestablishing the communications.

3. The method of claim 1, wherein providing the client device with the one or more client acknowledgments comprises:
providing the one or more client acknowledgments to a user agent application operating on the client device.

4. The method of claim 1, wherein providing the server device with the one or more server acknowledgments comprises:
providing the one or more server acknowledgments to a server agent application associated with the server device.

5. The method of claim 1, further comprising:
storing, in local storage and based on detecting the communication failure, the one or more network packets;
obtaining the one or more network packets from the local storage based on reestablishing the communications; and
providing the one or more network packets via the communication channel.

6. The method of claim 1, wherein reestablishing the communications comprises:
performing an abbreviated validation process when reestablishing the communications.

7. The method of claim 1, wherein the communication channel comprises an encrypted communication channel.

8. A network device, comprising:
one or more memories; and
one or more processors communicatively coupled to the one or more memories, configured to:
detect a communication failure associated with a communication channel between a client device and a server device, the communication failure being in at least one of:
a first portion of the communication channel between the client device and the network device, or
a second portion of the communication channel between the network device and the server device, and
wherein the communication failure is a result of at least one of:
a network going offline,
a server switching to a new network, or
detect a networking metric does not meet a threshold metric;
receive, from at least one of the client device or the server device, one or more network packets to be sent via the communication channel;
selectively:
provide, during the communication failure and when the one or more network packets are received from the client device, the client device with one or more client acknowledgments that correspond to each of the one or more network packets,
the one or more client acknowledgments providing the client device with no indication of the communication failure, or
provide, during the communication failure and when the one or more network packets are received from the server device, the server device with one or more server acknowledgments that correspond to each of the one or more network packets,
the one or more server acknowledgments providing the server device with no indication of the communication failure;
maintain, during the communication failure, the communication channel; and
reestablish communications, via the communication channel, while maintaining the communication channel.

9. The network device of claim 8, wherein the one or more processors, when reestablishing the communications, are configured to:
bypass at least one of a validation procedure or an authentication procedure when reestablishing the communications.

10. The network device of claim 8, wherein the one or more processors, when providing the client device with the one or more client acknowledgments, are configured to:
provide the one or more client acknowledgments to a user agent application operating on the client device.

11. The network device of claim 8, wherein the one or more processors, when providing the server device with the one or more server acknowledgments, are configured to:
provide the one or more server acknowledgments to a server agent application associated with the server device.

12. The network device of claim 8, wherein the one or more processors are further configured to:
store, in local storage and based on detecting the communication failure, the one or more network packets;
obtain the one or more network packets from the local storage based on reestablishing the communications; and
provide the one or more network packets via the communication channel.

13. The network device of claim 8, wherein the one or more processors, when reestablishing the communications, are configured to:
perform an abbreviated validation process when reestablishing the communications.

14. The network device of claim 8, wherein the communication channel comprises an encrypted communication channel.

15. A non-transitory computer-readable medium storing instructions, the instructions comprising:
one or more instructions that, when executed by one or more processors of a network device, cause the one or more processors to:
detect a communication failure associated with a communication channel between a client device and a server device, the communication failure being in at least one of:
a first portion of the communication channel between the client device and the network device, or
a second portion of the communication channel between the network device and the server device, and
wherein the communication failure is a result of at least one of:
a network going offline,
a server switching to a new network, or
detect a networking metric does not meet a threshold metric;

receive, from at least one of the client device or the server device, one or more network packets to be sent via the communication channel;

selectively:
provide, during the communication failure and when the one or more network packets are received from the client device, the client device with one or more client acknowledgments that correspond to each of the one or more network packets,
the one or more client acknowledgments providing the client device with no indication of the communication failure, or
provide, during the communication failure and when the one or more network packets are received from the server device, the server device with one or more server acknowledgments that correspond to each of the one or more network packets,
the one or more server acknowledgments providing the server device with no indication of the communication failure;
maintain, during the communication failure, the communication channel; and
reestablish communications, via the communication channel, while maintaining the communication channel.

16. The non-transitory computer-readable medium of claim 15, wherein the one or more instructions, that cause the one or more processors to reestablish the communications, cause the one or more processors to:
bypass at least one of a validation procedure or an authentication procedure when reestablishing the communications.

17. The non-transitory computer-readable medium of claim 15, wherein the one or more instructions, that cause the one or more processors to provide the client device with the one or more client acknowledgments, cause the one or more processors to:
provide the one or more client acknowledgments to a user agent application operating on the client device.

18. The non-transitory computer-readable medium of claim 15, wherein the one or more instructions, that cause the one or more processors to provide the server device with the one or more server acknowledgments, cause the one or more processors to:
provide the one or more server acknowledgments to a server agent application associated with the server device.

19. The non-transitory computer-readable medium of claim 15, wherein the one or more instructions, when executed by the one or more processors, further cause the one or more processors to:
store, in local storage and based on detecting the communication failure, the one or more network packets;
obtain the one or more network packets from the local storage based on reestablishing the communications; and
provide the one or more network packets via the communication channel.

20. The non-transitory computer-readable medium of claim 15, wherein the one or more instructions, that cause the one or more processors to reestablish the communications, cause the one or more processors to:
perform an abbreviated validation process when reestablishing the communications.

* * * * *